(12) United States Patent
Buckler et al.

(10) Patent No.: US 12,139,273 B2
(45) Date of Patent: Nov. 12, 2024

(54) GUN MOUNT FOR GROUND ATTACK AIRCRAFT

(71) Applicants: Matthew Thomas Buckler, Fredericksburg, VA (US); Michael M. Canaday, King George, VA (US); Thomas Klebert Houck, Jr., Woodford, VA (US); Gregory Noble Fish, King George, VA (US); William Michael McCoy, III, King George, VA (US); Nathan Arnold Lambert, King George, VA (US); Timothy Gerald Burcham, Fredericksburg, VA (US); Xavier Anthony Quinn, Alexandria, VA (US); Douglas Lawrence Ramers, Blanchard, ID (US); Sabrina Hong-Yee Lau, Spotsylvania, VA (US)

(72) Inventors: Matthew Thomas Buckler, Fredericksburg, VA (US); Michael M. Canaday, King George, VA (US); Thomas Klebert Houck, Jr., Woodford, VA (US); Gregory Noble Fish, King George, VA (US); William Michael McCoy, III, King George, VA (US); Nathan Arnold Lambert, King George, VA (US); Timothy Gerald Burcham, Fredericksburg, VA (US); Xavier Anthony Quinn, Alexandria, VA (US); Douglas Lawrence Ramers, Blanchard, ID (US); Sabrina Hong-Yee Lau, Spotsylvania, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/211,763

(22) Filed: Jun. 20, 2023

(65) Prior Publication Data
US 2024/0116632 A1    Apr. 11, 2024

Related U.S. Application Data

(60) Provisional application No. 63/354,719, filed on Jun. 23, 2022.

(51) Int. Cl.
| F41A 25/20 | (2006.01) |
| B64D 7/02 | (2006.01) |
| F41A 25/16 | (2006.01) |

(52) U.S. Cl.
CPC .............. *B64D 7/02* (2013.01); *F41A 25/16* (2013.01)

(58) Field of Classification Search
CPC ................................. F41A 25/16; F41A 25/20
(Continued)

(56) References Cited

U.S. PATENT DOCUMENTS 531,157 A * 12/1894 Canet ...................... F41A 5/32
 89/43.01
724,398 A * 3/1903 Resow .................... F41A 25/02
 89/43.01

(Continued)

*Primary Examiner* — Bret Hayes
(74) *Attorney, Agent, or Firm* — Gerhard W. Thielman

(57) ABSTRACT

A recoil device is provided for a gun having a barrel with a breech. The device includes a breech nut, a brake assembly, a pneumatic spring and a counter-recoil buffer. The breech nut has first and second adjacent sides. The brake assembly includes a brake cylinder that mounts to the breech nut on the first side. The pneumatic spring mounts to the breech nut on the second side. The counter-recoil buffer attaches to the pneumatic spring. The brake cylinder and the pneumatic spring internally push fluids for recoil absorption and return in response to firing the gun.

5 Claims, 27 Drawing Sheets

(58) Field of Classification Search
USPC .......................................................... 89/43.01
See application file for complete search history.

(56) References Cited

U.S. PATENT DOCUMENTS

| | | | | |
|---|---|---|---|---|
| 2,473,211 | A * | 6/1949 | Metzel | F41A 25/20 |
| | | | | 89/43.01 |
| 3,410,174 | A * | 11/1968 | Hahn | F16F 9/44 |
| | | | | 89/43.01 |
| 3,599,530 | A * | 8/1971 | Seamands | F41A 25/20 |
| | | | | 89/43.01 |
| 4,827,829 | A * | 5/1989 | Stoner | F41A 9/45 |
| | | | | 89/43.01 |
| 4,924,751 | A * | 5/1990 | Metz | F41A 25/20 |
| | | | | 89/43.01 |
| 6,571,676 | B1 * | 6/2003 | Folsom | F41A 3/74 |
| | | | | 42/75.02 |
| 2012/0266747 | A1 * | 10/2012 | Wynes | F41A 5/36 |
| | | | | 89/43.01 |

* cited by examiner

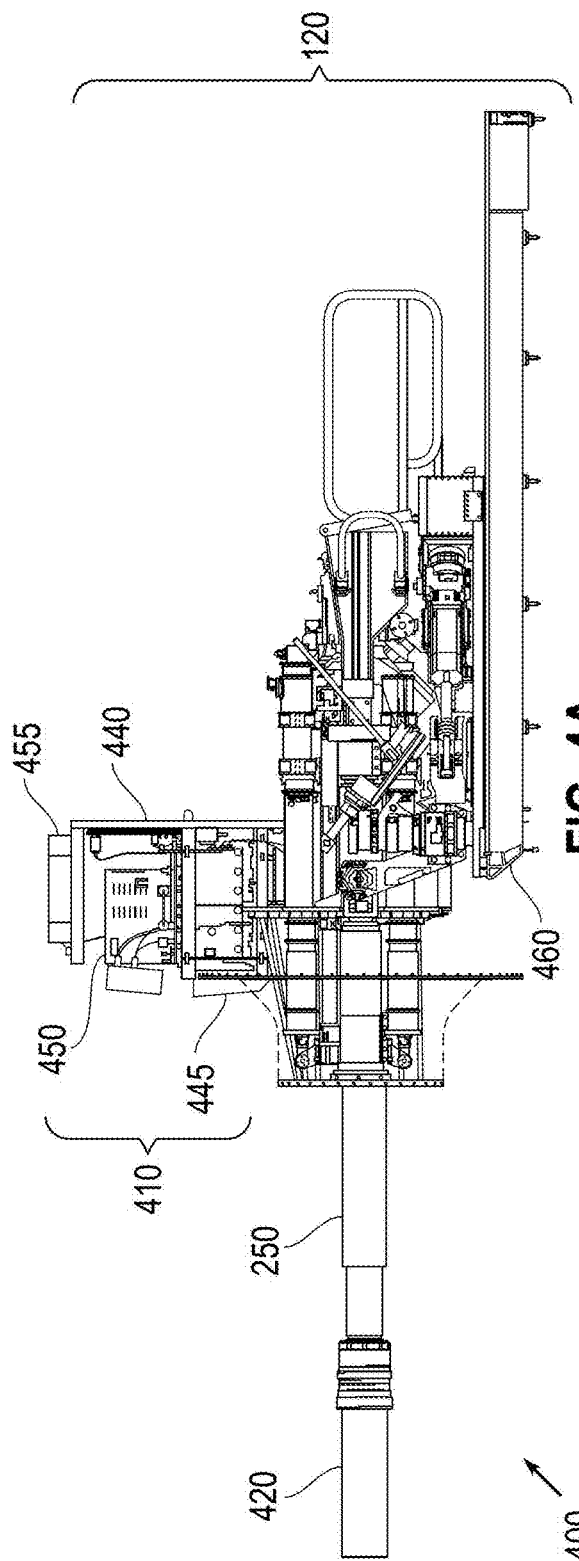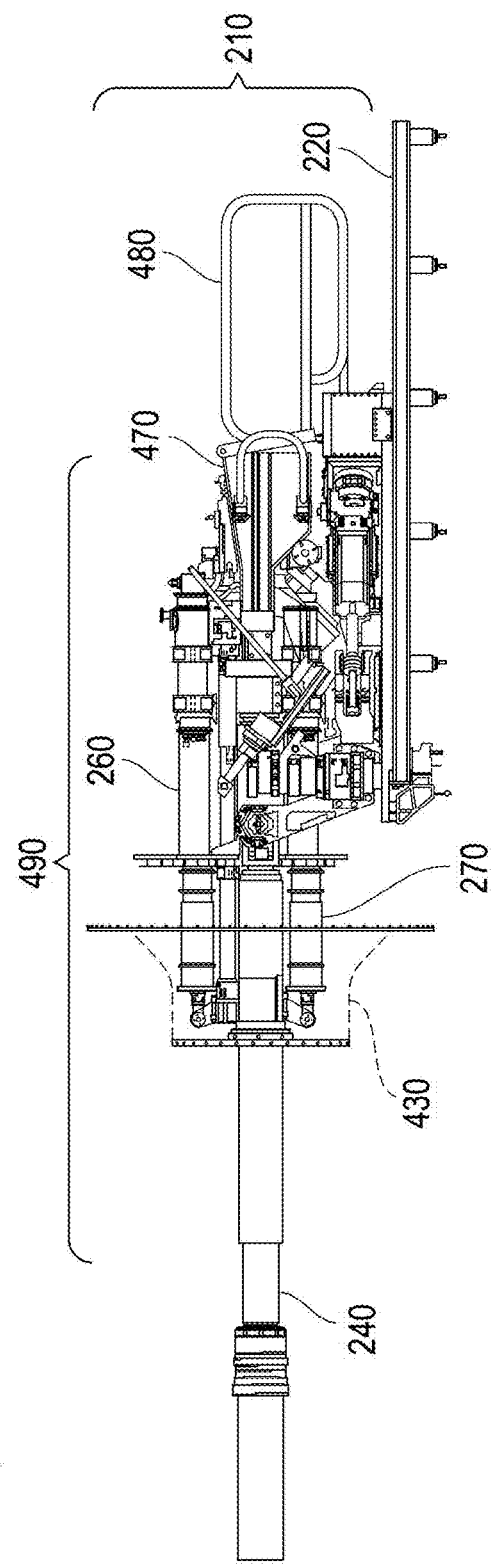
FIG. 4A
FIG. 4B

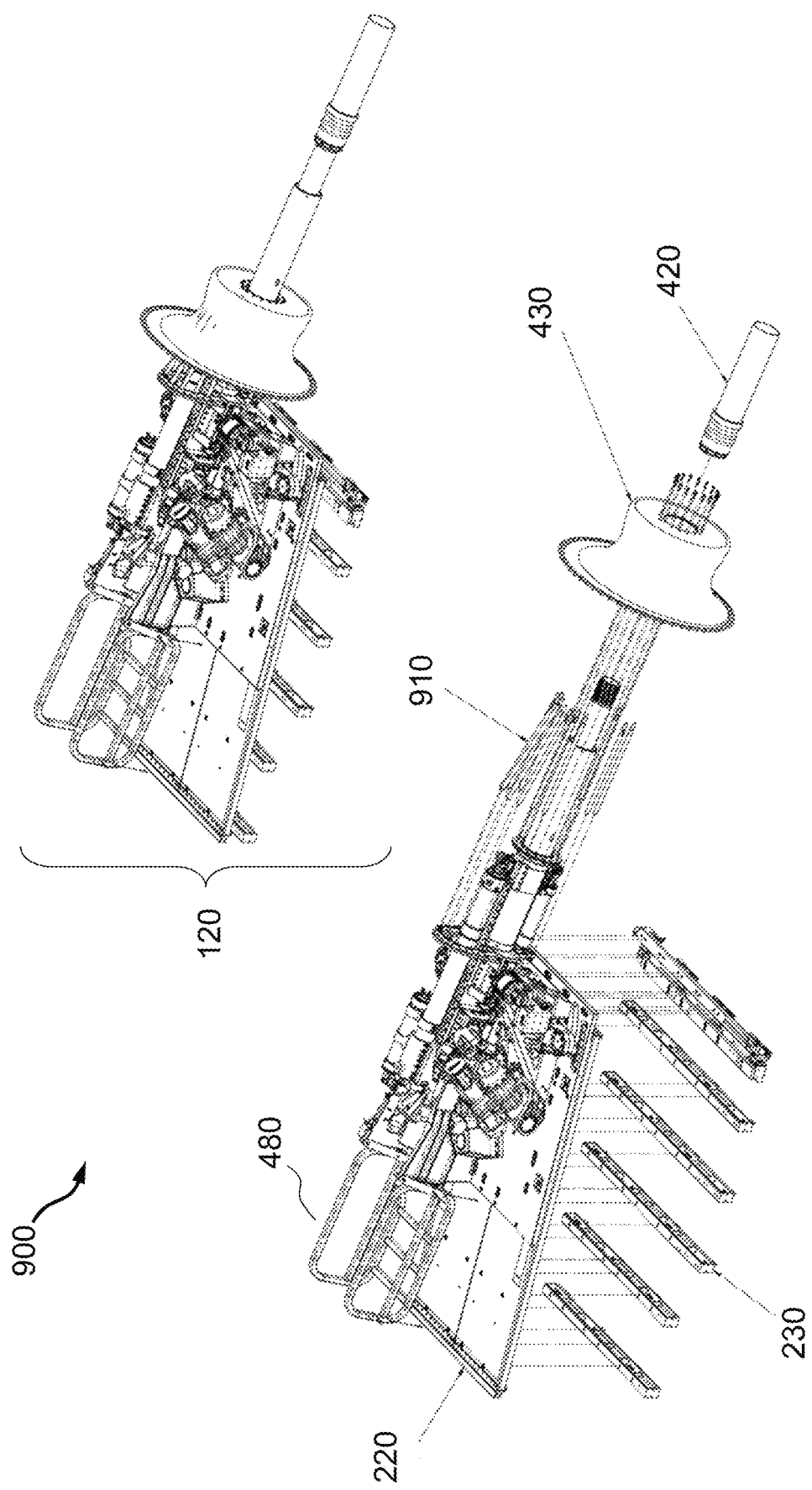

GUN MOUNT FOR GROUND ATTACK AIRCRAFT

CROSS REFERENCE TO RELATED APPLICATION

Pursuant to 35 U.S.C. § 119, the benefit of priority from provisional application 63/354,719, with a filing date of Jun. 23, 2022, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mounts for aircraft guns. In particular, the invention relates to recoil suppression for such cradle mounts.

The 105 mm Gun Aircraft Unit (GAU) is an aerial gun system having a recoil mechanism and cradle integrated into a Trainable Gun Mount (TGM). The 105 mm GAU was designed specifically for integration into large aircraft (e.g., Lockheed AC-130H Spectre gunships) that perform ground support missions. The functional purpose of the GAU is to enable the aircraft to align to a target and fire artillery rounds at depressed angles while in flight.

Prior to the exemplary 105 mm GAU, a special operation command for the U.S. Air Force relied on a modified cradle from the U.S. Army's M102 Howitzer along with the M37A1 recoil mechanism. The original design of the cradle and recoil mechanism was intended for use with a field artillery gun. When this design was adapted to aerial applications, the original design was modified to make the gun system functional. However, the design still had many shortcomings that result in significant stress to the airframe.

For example, the original field artillery piece was designed to shoot at a positive angle and the recoil mechanism is designed to return the gun into a fire ready position via a counter-force having a vertical component opposite to the force of gravity. When this same system is used at a depressed angle, the typical position for ground support functions, the resulting counter-force has a component aligned with gravity thereby compounding the return force. This compounding force results in a large impulse force to the gun cradle and airframe that can lead to material fatigue and long-term damage to the weapon system and aircraft.

SUMMARY

Conventional aerial gun cradles yield disadvantages addressed by various exemplary embodiments of the present invention. In particular, various exemplary embodiments provide a recoil device for a gun having a barrel with a breech. The device includes a breech nut, a brake assembly, a pneumatic spring and a counter-recoil buffer. The breech nut has first and second adjacent sides. The brake assembly includes a brake cylinder that mounts to the breech nut on the first side. The pneumatic spring mounts to the breech nut on the second side. The counter-recoil buffer attaches to the pneumatic spring. The brake cylinder and the pneumatic spring internally push fluids for recoil absorption and return in response to firing the gun.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 4A and 4B are elevation views of the 105 mm GAU.

FIG. 9 is an isometric assembly view of the gun system;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches (") or feet (ft), mass in grams (g) or pounds-mass ($lb_m$), time in seconds (s), angles in degrees)(°, and force in newtons (N) or pounds-force ($lb_f$). Supplemental measures can be derived from these, such as pressure in pounds-per-square-inch (psi), density in grams-percubic-centimeters ($g/cm^3$), moment of inertia in gram-square-centimeters ($kg-m^2$) and the like.

The M102 Howitzer cradle and the M37A1 recoil mechanism are both obsolete designs that are no longer supported by the U.S. Army. The M102 howitzer's cradle was designed using custom extrusions and casting. The M37A1 recoil mechanism was designed around common seal technology whose manufacturing practices are almost eighty years old and no longer in general use. The recoil mechanism seals would have required design modifications to facilitate modern manufacturing processes.

The exemplary cradle and recoil mechanism are designed for depressed angle firing of the weapon, smaller impulse forces delivered to the cradle and airframe, and a shorter recoil stroke. This results in less stress to the gun cradle and airframe with a corresponding reduction in material fatigue and potential long term damage. This effort is further described in an article in The Drive (available at https: www.thedrive.com/the-war-zone/43941/ac-130-gunships-are-finally-getting-a-new-105mm-howitzer).

Figure 1:
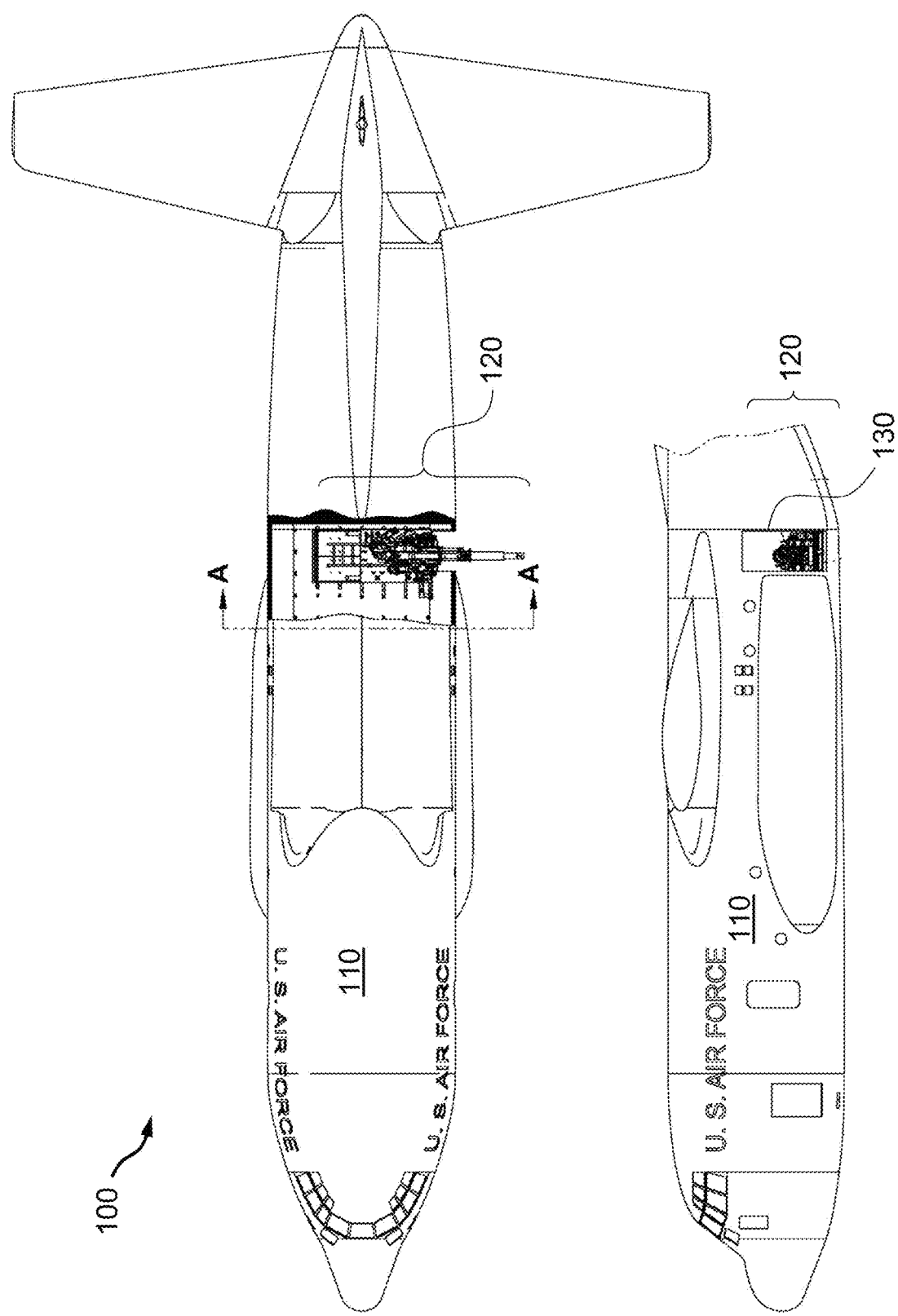
FIG. 1 is an elevation and plan view of an AC-130 aircraft with an exemplary 105 mm Gun Aircraft Unit (GAU) with Trainable Gun Mount (TGM)

FIG. 1 shows elevation views 100 of an AC-130 aircraft 110 as operated by the U.S. Air Force. An exemplary gun system 120 for a 105 mm Gun Aircraft Unit (210 in FIG. 2) is disposed on a trainable gun mount (or TGM 1010 in FIG. 10) atop the floor (310 in FIG. 3) of the aircraft 110 to point laterally outward through a door hatch 130. Section A-A points aft.

Figure 2:
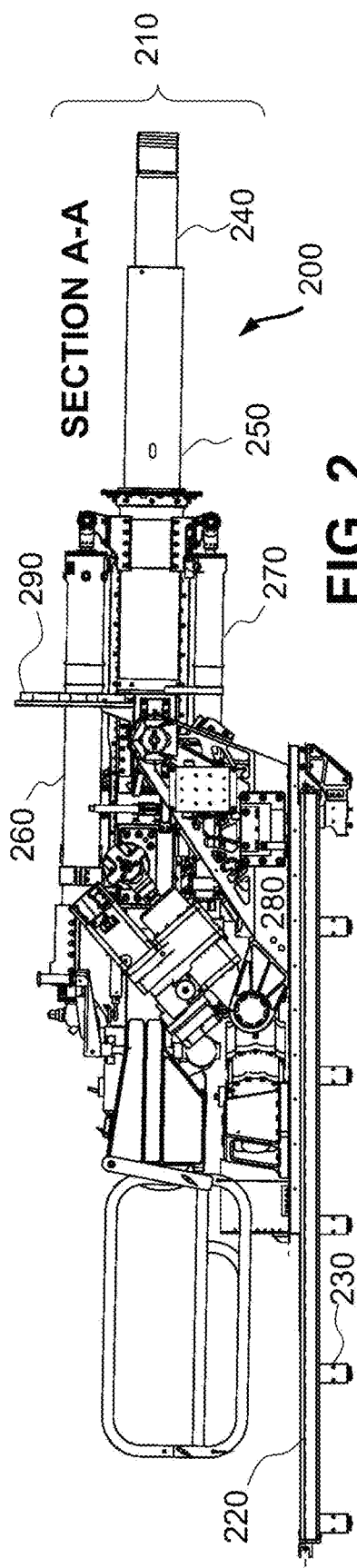
FIG. 2 is an elevation view of the 105 mm GAU (sans auxiliary equipment)

FIG. 2 shows an elevation view 200 of the 105 mm Gun Aircraft Unit (GAU) 210 for the gun system 120 along Section A-A disposed on a pallet 220 supported by rails 230 on the floor 310 of the aircraft 110. The 105 mm GAU 210 includes a gun tube 240 within a recoil sleeve 250. Recoil can be mitigated by a brake assembly 260 and a pneumatic spring assembly 270 that flank the recoil sleeve 250 from above and below the tube 240. An elevation actuator bracket 280 is disposed above the pallet 220. The assemblies 260 and 270 are restrained within a yoke 290.

Figure 3:
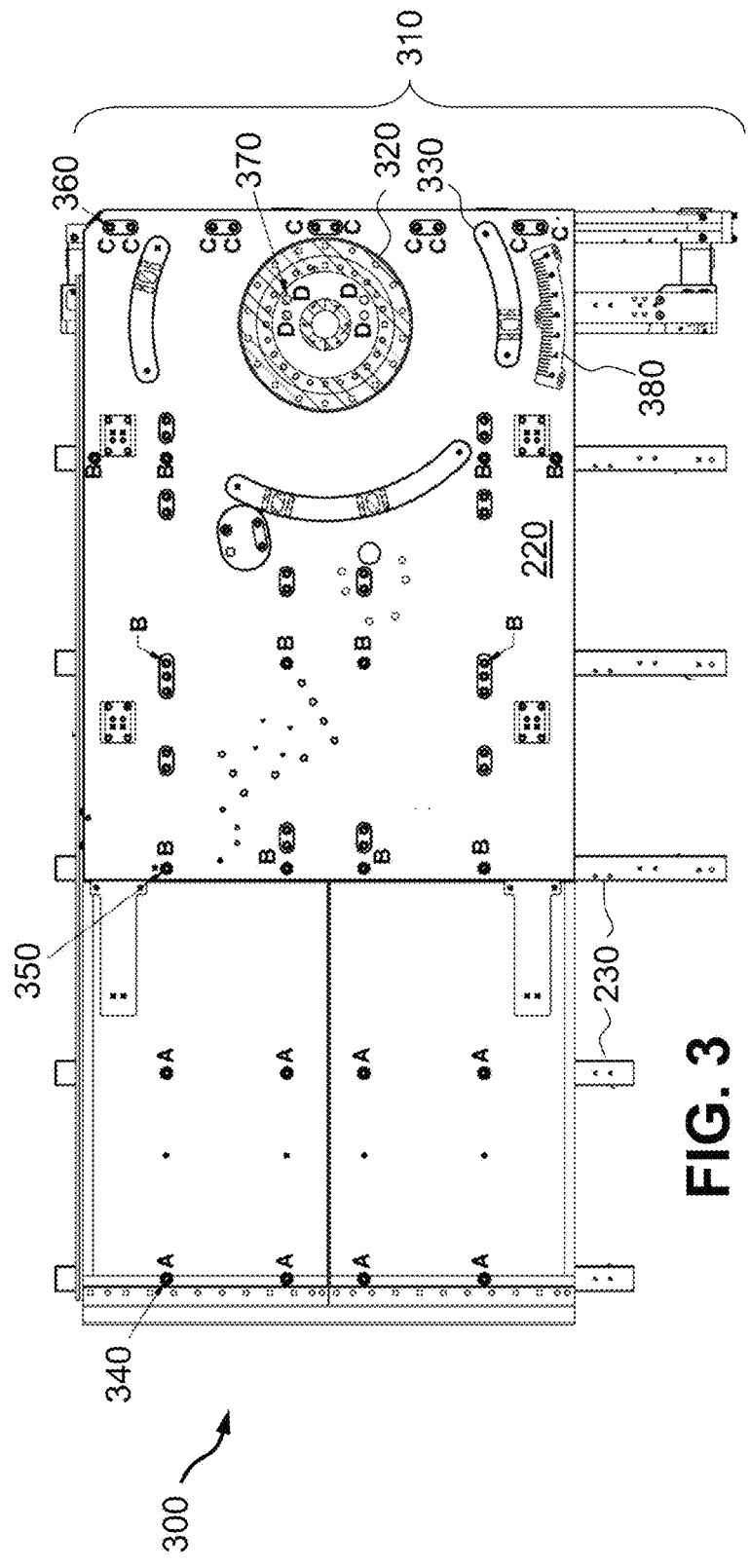
FIG. 3 is a plan view of the baseplate and floor attaching to the 105 mm GAU.

FIG. 3 shows a plan view 300 of the pallet 220 with the rails 230 as a floor mount assembly 310. The pallet 220 includes a circular bearing seat 320 surrounded by wear pads 330. Attach holes A 340, B 350, C 360 and D 370 provide interfaces. An azimuth scale 380 indicates sweep extent.

FIGS. 4A and 4B show elevation views 400 of the gun system 120. An instrument rack 410 houses auxiliary equipment. A diffuser 420 attaches to the barrel 240 at its muzzle end. A pressure seal 430 provides an interface between the cradle (670 in FIG. 6) and the hatch 130. The rack 410 includes an operator interface panel 440 from which a communication box 445, an input/output (I/O) box 450 and a network switch 455 are mounted. Aft end covers 460 beneath the pallet 220 protect the rails 230 from debris. Adjacent safety cage arms 470 and the safety cage 480 protect the operators from the recoiling mass during gun fire. A gun cradle 490 provides structural support for the 105 mm GAU 210 on the pallet 220.

Figure 5A:
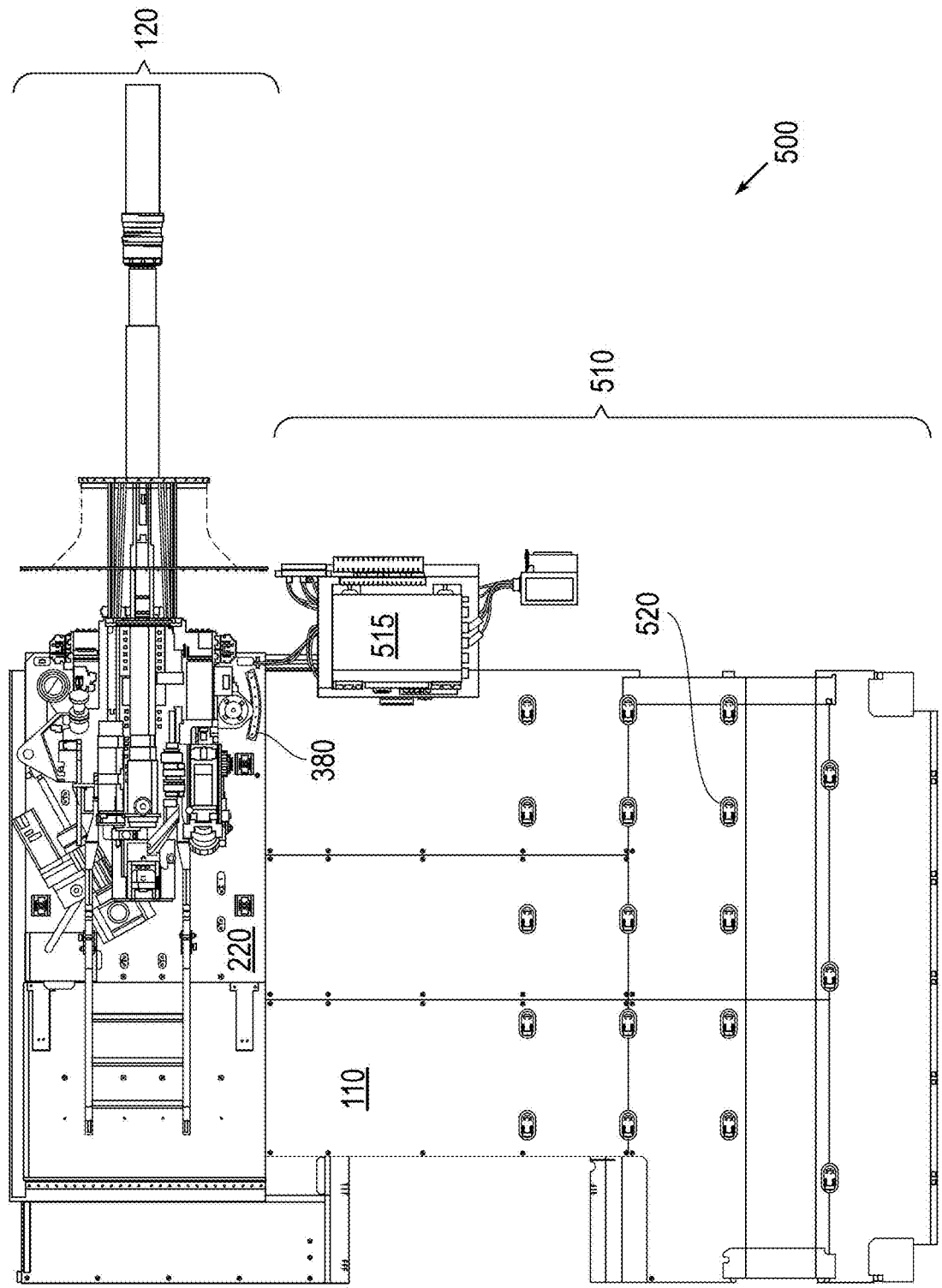
FIG. 5A is a plan view of the 105 mm GAU and TGM with an electronics rack and raised floor.
Figure 5B:
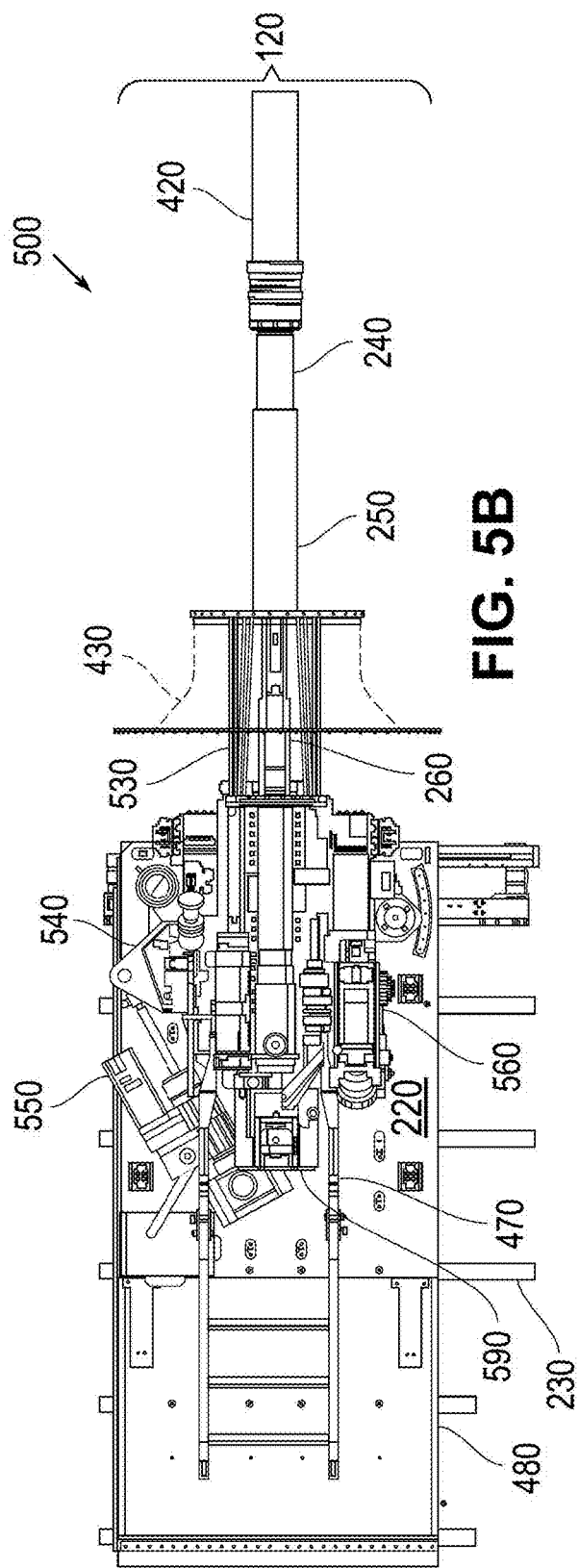
FIG. 5B is a plan view of the 105 mm GAU with a pressure seal and blast diffuser.
Figure 5C:
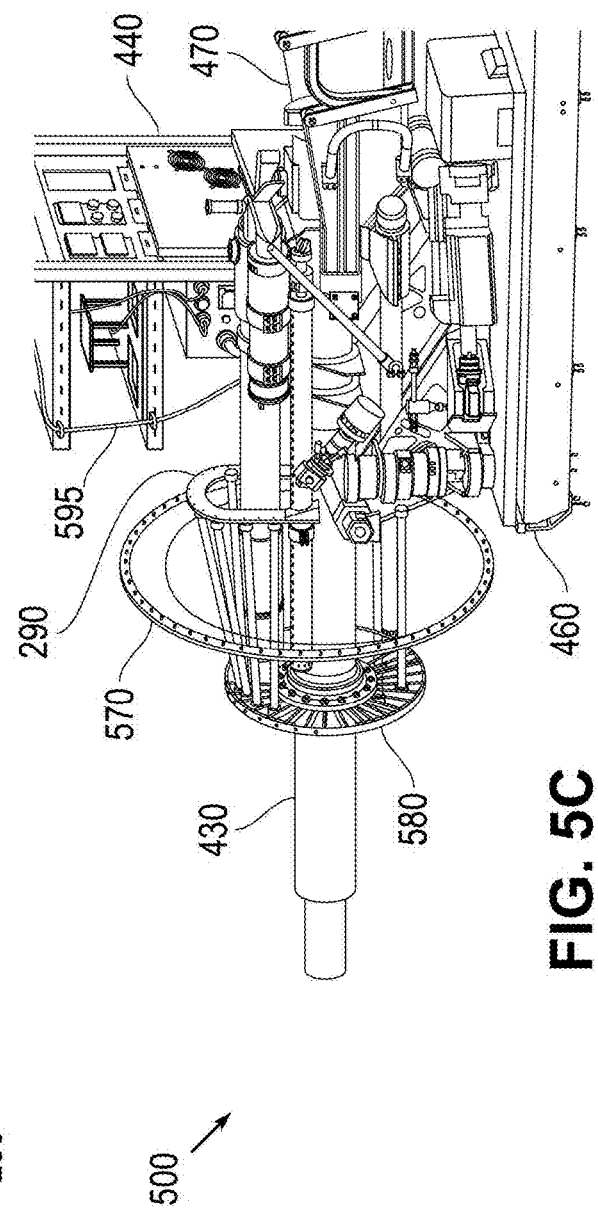
FIG. 5C is an isometric view of the 105 mm GAU and TGM.

FIGS. 5A, 5B and 5C show assembly views 500 of the gun system 120. FIGS. 5A and 5B provide plan perspectives, while FIG. 5C features an isometric perspective. A raised floor assembly 510 and an electronics rack 515. The raised floor assembly 510 includes anchor points 520. A retraction cylinder 530 provides the ability to pump the recoil mechanism (1110 in FIG. 11) out of battery to pressurize the aircraft as well as aid in maintenance of the system.

An azimuth actuator bracket 540 and the azimuth actuator 550 along with an elevation actuator 560 provides the ability to train the 105 mm GAU 210 to acquire targets on the ground. The pressure seal 430 includes an aircraft interface ring 570 and a pressure plate 580. The 105 mm GAU 210 is loaded through a breech 590. An electronics harness 595 transfers power and signals from the rack 515 to the 105 mm GAU 210.

Figure 6A:
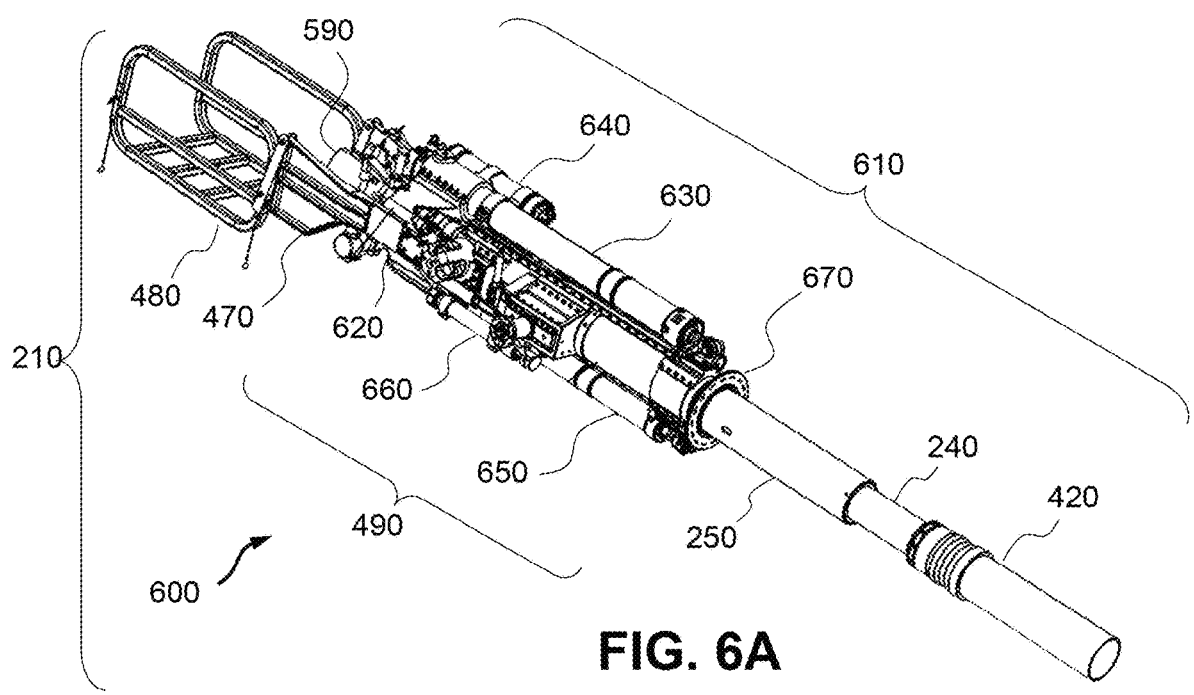
FIG. 6A is an isometric assembly view of the 105 mm GAU.

FIG. 6A shows an assembly view 600 of a 105 mm GAU 210 (sans TGM equipment). Absent the safety cage 480 and safety cage arms 470, a barrel recoiling assembly 610 is subdivided into two major sub-assemblies: the gun cradle 490 and the recoil mechanisms comprising the brake and spring assemblies 260 and 270. Identified components include breech nut 620, hydraulic brake cylinder 630, replenish cylinder 640, pneumatic spring cylinder 650, external counter-recoil buffers 660, annular flange 670, blast diffuser 420, safety cage arms 470 and safety cage 480. These cylinders 630, 640 and 650 are hollow. A breech cam 680 is strapped to the breech 590. The left side of view 600 presents the (distal) breech end, while the right side of view 600 presents the (proximal) muzzle end.

Figure 6B:
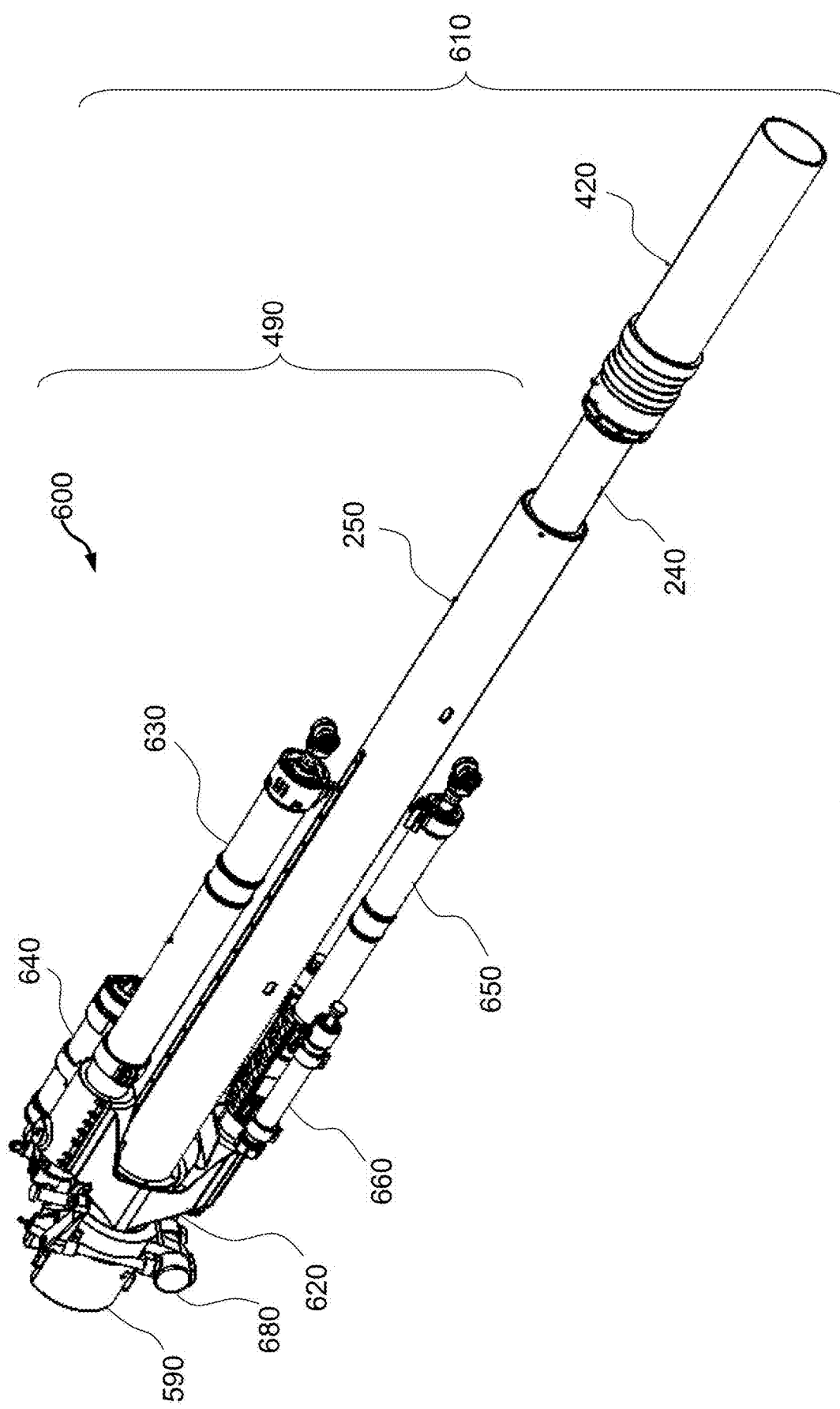
FIG. 6B is an isometric assembly view of a recoiling assembly.

FIG. 6B shows an assembly view 600 of the recoiling assembly 610. This includes the breech 590, the breech nut 620, breech cam 680, brake and replenish cylinders 630 and 640, pneumatic spring cylinder 650, counter-recoil buffers 660 and flange 670 labeled in view 600. The stationary recoiling mechanism includes the flange 670, the spring assembly 270, and brake assembly 260 that serves as an elevation actuator bracket.

Figure 7:
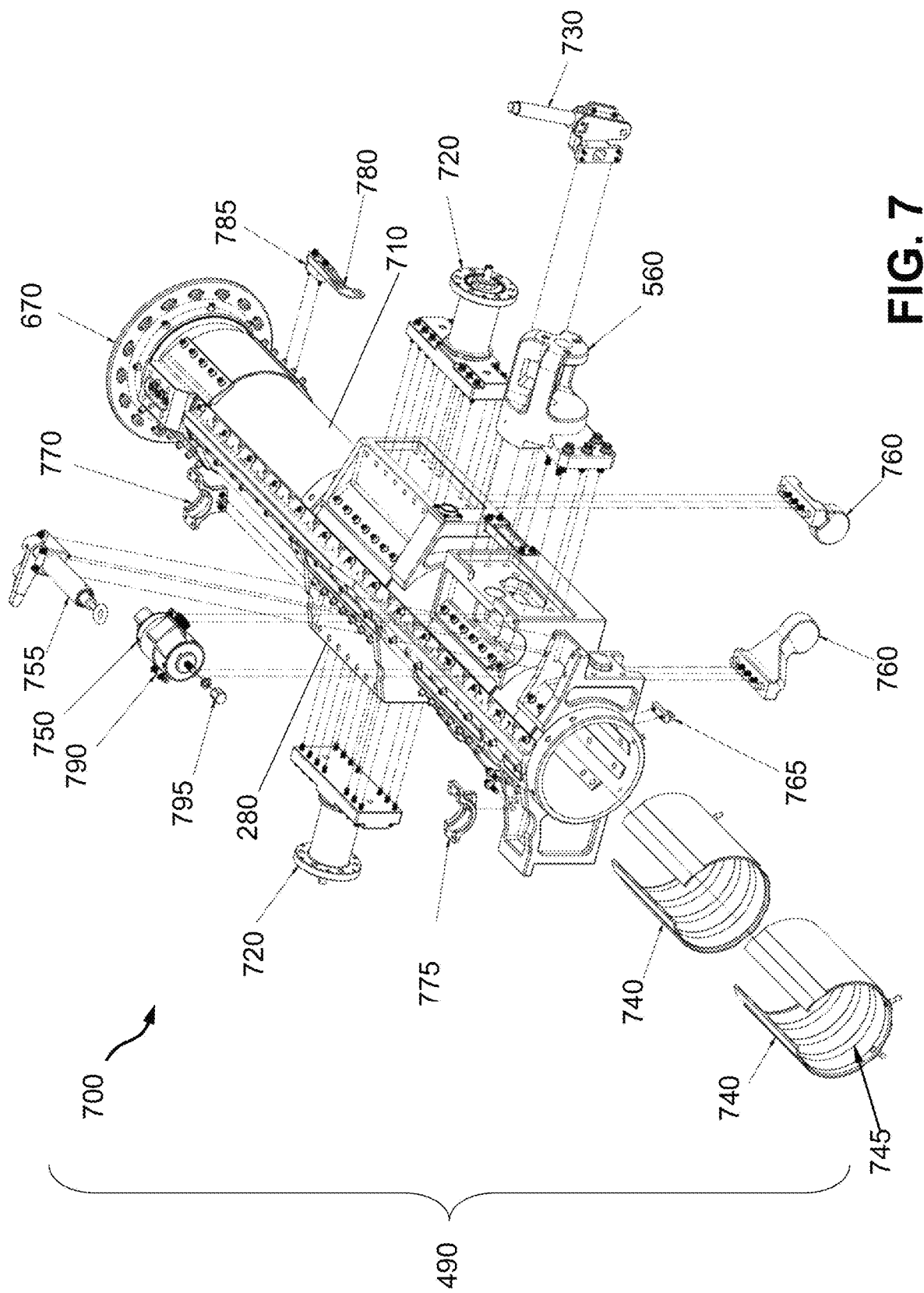
FIG. 7 is an isometric exploded view of gun aircraft unit cradle assembly.

FIG. 7 shows an isometric exploded view 700 of the gun cradle 490 and its flange 670. A cradle tube 710 constitutes the main structure of the cradle 490. The tube 710 attaches to the elevation actuator bracket 280 by two trunnion assemblies 720 turned by the elevation actuator 560 adjacent to an out-of-battery stow pin assembly 730 that attach to the elevation actuator bracket 280. The trunnions 720 enable the 105 mm GAU 210 to pitch in elevation in order to acquire targets. The stow pin assembly 730 enables the recoiling assembly 610 to be held out-of-battery for long flights and pressurization.

The 105 mm GAU's cradle 490 has two wear sleeves 740 attached to the inside bore of the tube 710. Each wear sleeve 740 has four circumferential polymer wear strips 745 around the inside diameter of the sleeves 740 facilitating replacement when the polymer wear strips 745 reach a critically low level. The strips 745 provide the sliding wear surface that the recoiling assembly 610—in particular the recoil sleeve 250—slides along.

A push solenoid 750 actuates a firing pawl 755, which strikes a transfer rod 840 (FIG. 8) that correspondingly fires the 105 mm GAU 210. The cradle 490 further includes a pair of counter-recoil buffer strike-plate brackets 760 that attach to the actuator 280. Additional such mounts include a sensor bracket 765, outboard bracket 770, inboard bracket 775 and sensor bracket 780 with a bracket spacer 785. The push solenoid 750 includes solenoid bracket 790 and a threaded cap 795.

Figure 8:
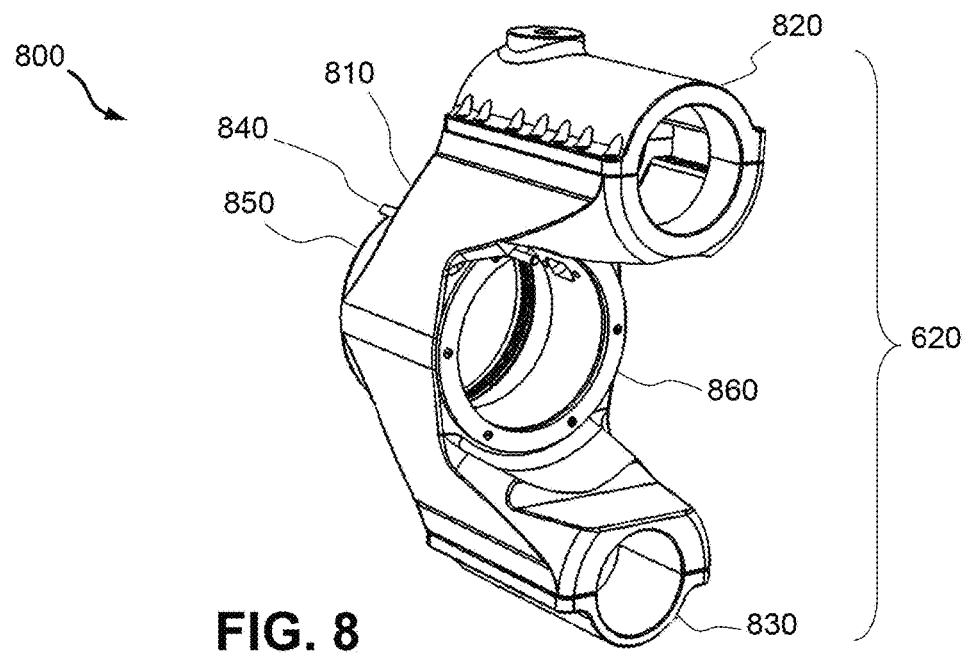
FIG. 8 is an isometric assembly view of a breech nut.

FIG. 8 shows an isometric view 800 of the breech nut 620, which absorbs the entire breech force of a recoil event and represents the primary structure that holds the recoiling assembly 610 together. The breech nut 620 includes a main body 810, cylinder breech nut cap 820 at its top, spring cylinder nut cap 830 at its bottom and a transfer rod 840. The breech nut 620 is composed from high-strength steel. The main body 810 includes an import opening 850 and an export opening 860 that demarcates a through-port chamber for attaching to the recoil sleeve 250, with the transfer rod 840 disposed along the periphery of this chamber.

The 105 mm GAU 210 includes a recoiling assembly 610 and cradle 490 designed for installation into a Trainable Gun Mount (TGM) and shot from an AC-130 gunship 110. The recoiling assembly 610 was designed to absorb about a half-a-million pounds of force from the gunfire event and alter this into a more manageable nine-thousand pounds dispersed over about 44". The recoiling assembly 610 has a maximum acceleration of about 11,270 ft/s$^2$ (3435 m/s$^2$ or 350 g's) during gunfire. The maximum recoil distance is 48". The recoiling assembly 610 weighs about 1800 lb$_m$. The cradle 490 weighs about 400 lb$_m$. The system (trunnions up) weighs about 2200 lb$_m$. The total cycle time is about 1 s to 3 s depending on the angle of depression at the time the 105 mm GAU 210 is fired.

FIG. 9 shows an isometric exploded and assembly views 900 of the gun mount assembly 120 atop the aircraft pallet 220 separated from the aircraft floor 310 by a series of rails 230. Spring loaded rods 910 connect the yoke 290 to the pressure plate 580, thereby preventing the recoiling assembly 610 from contacting the pressure seal 430 during gun fire.

Figure 10:
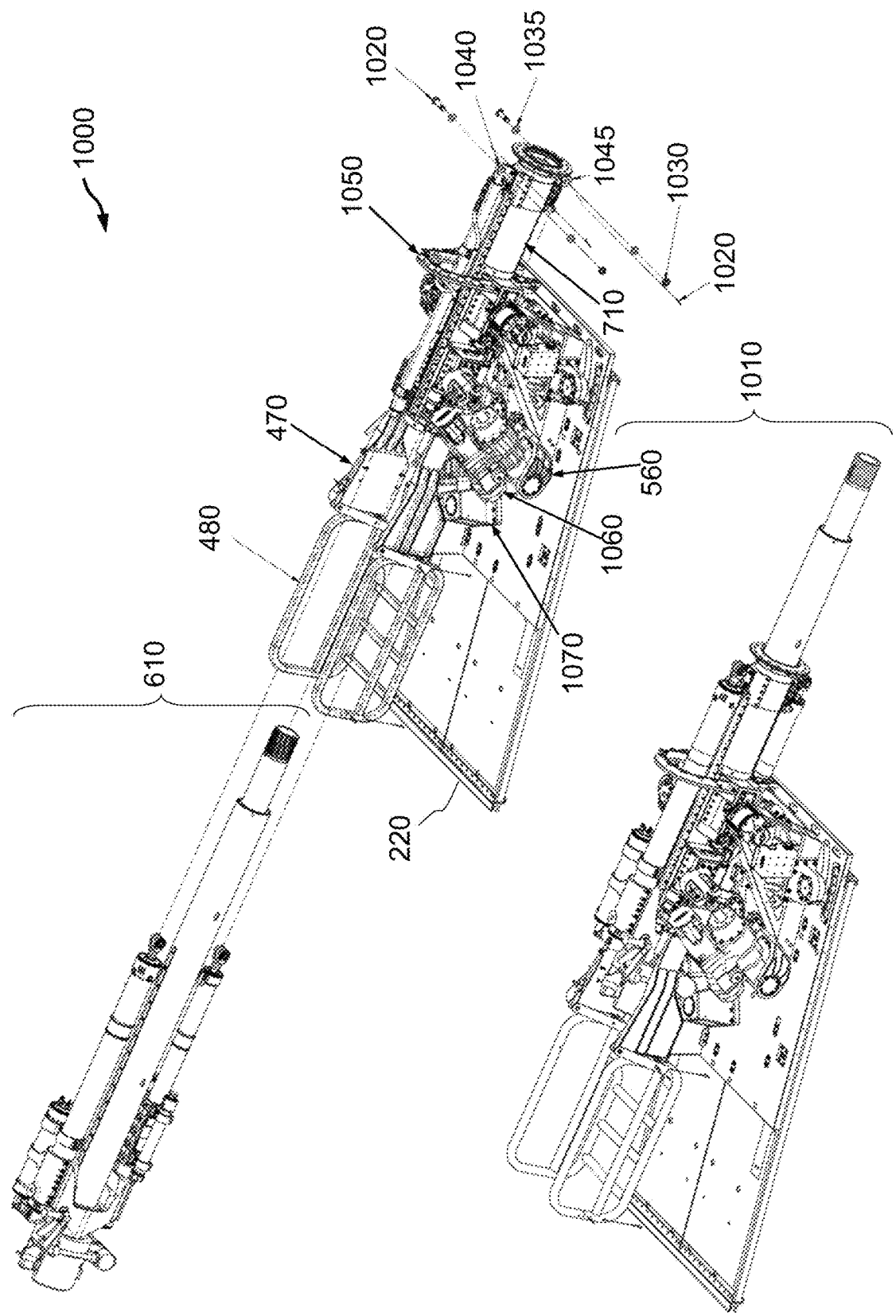
FIG. 10 is an isometric assembly view of the gun system.

FIG. 10 shows an isometric exploded and assembly views 1000 of a trainable gun mount (TGM) 1010. These include the pallet 220 and safety cage 480, as well as pins 1020, nuts 1030, upright 1035, ring spacers 1040 and upright 1045. The recoil sleeve 250 inserts through the cradle 490. Additional components elevation actuator bracket 560, elevation actuator 1060 and azimuth actuator bracket 1070 enable the 105 mm GAU 210 to acquire targets on the ground.

Figure 11:
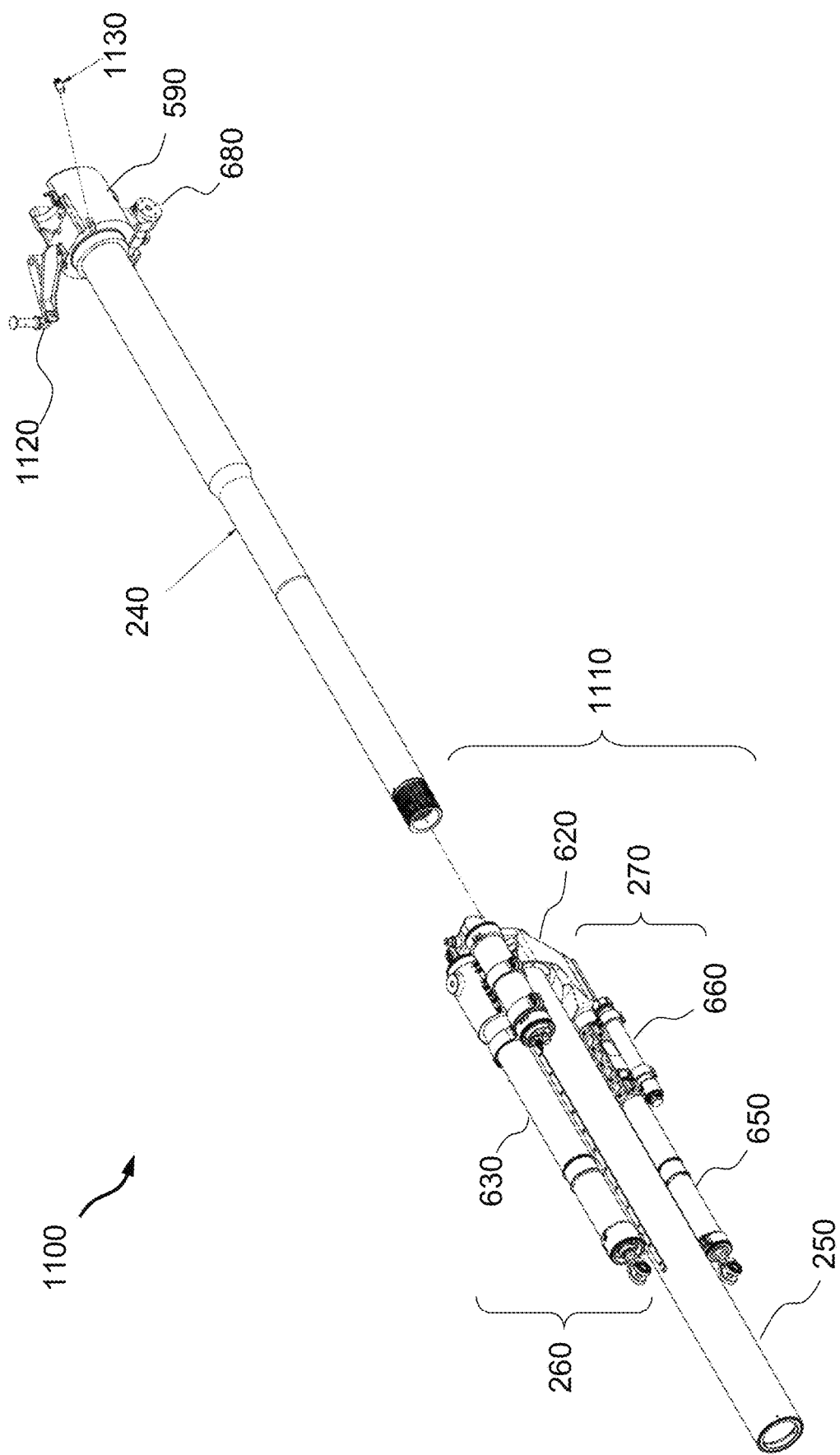
FIG. 11 is an isometric exploded view of the gun tube and breech with recoil mechanism.

FIG. 11 shows an isometric exploded view 1100 of a recoil mechanism 1110 for the 105 mm GAU 210, including the cradle 490 and the recoiling assembly 610. The recoil mechanism 1110 includes the brake assembly 260 with brake cylinder 630 and replenish cylinder 640, as well as the pneumatic spring assembly 270 with pneumatic spring cylinder 650 and a pair of counter-recoil buffers 660. The breech nut 620 attaches to the gun tube 240 and breech 720 to the recoil mechanism 1110. The handle 1120 opens the breech and key 1130 locks the breech 720 to the recoil mechanism 1110.

Figure 12:
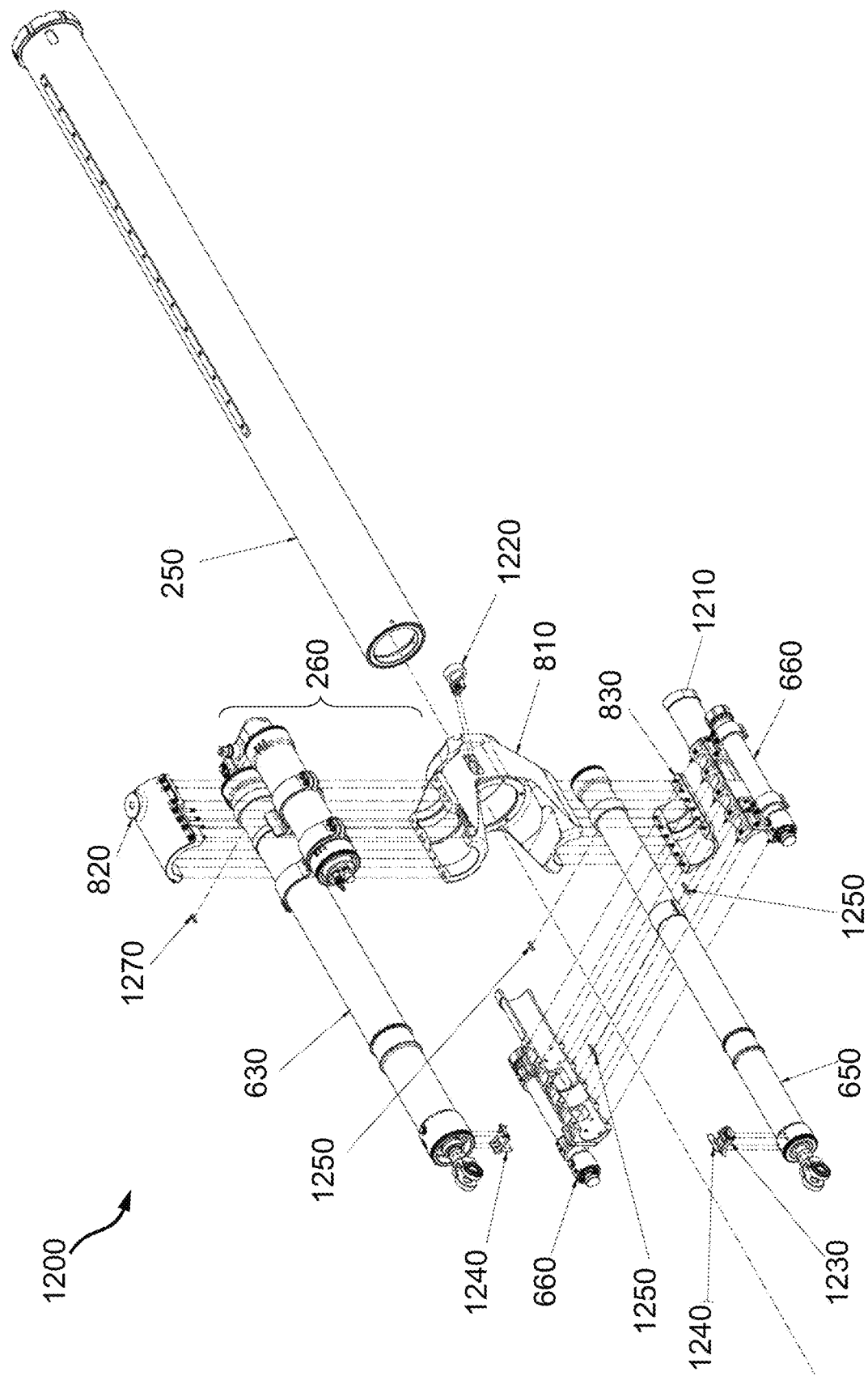
FIG. 12 is an isometric exploded view of the recoil mechanism.

FIG. 12 shows an isometric exploded view 1200 of the recoil mechanism 1110, including brake and spring assemblies 260, 270. Beyond the components labeled in views 600 and 800, the components further include caps 820 and 830 onto the housing 810, as well as counter-recoil buffer housings 1210, sleeve key 1220, cylinder end supports 1230 and 1240, and square keys 1250. The brake assembly 260 includes the brake and replenish cylinders 630, 640, both containing liquid brake fluid. The spring assembly 270 includes the pneumatic cylinder 650 and recoil buffers 660, both containing gaseous air. The housing 810 slides onto the recoil sleeve 250.

Figure 13A:
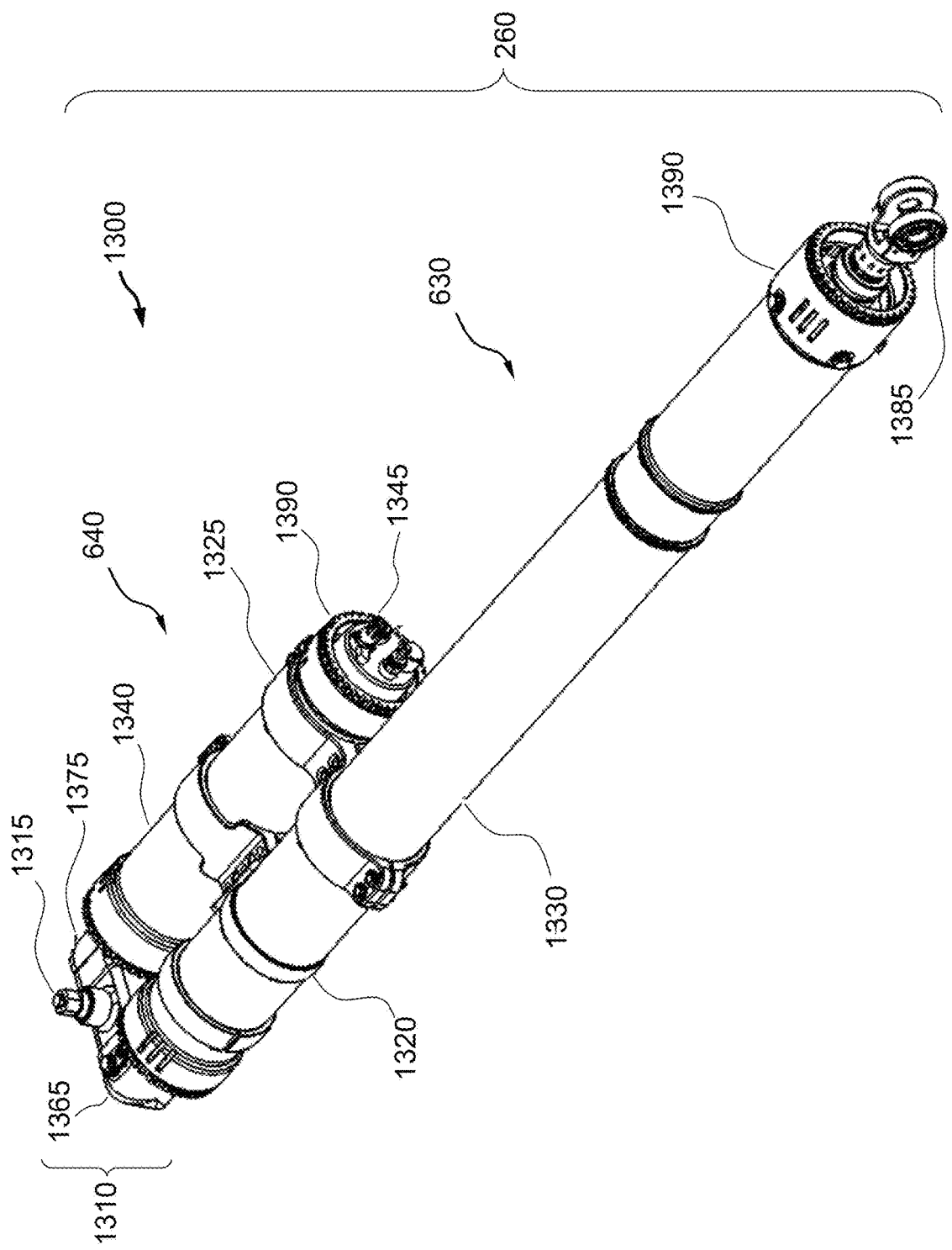
FIGS. 13A and 13B are isometric assembly and cutaway views of the brake assembly.
Figure 13B:
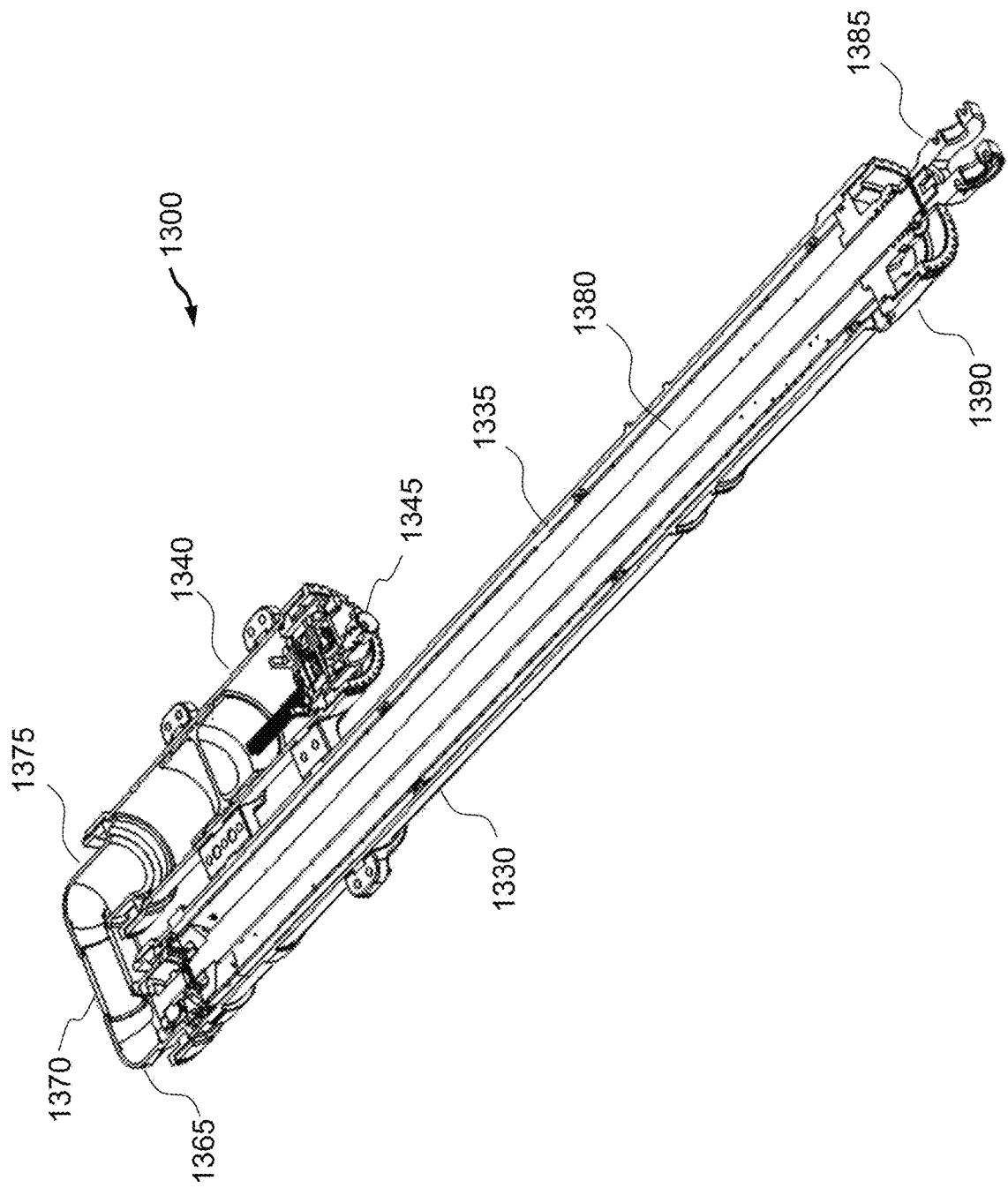

FIGS. 13A and 13B show isometric assembly and cutout views 1300 of the counter-recoil brake assembly 260 comprising the brake and replenish cylinders 630, 640 internally connected by a coupler 1310 with a fill-valve 1315 and held together by clamps 1320 and 1325. The brake cylinder 630 includes a brake tube 1330 with a recoil orifice sleeve 1335, and the replenish cylinder 640 includes a replenish tube 1340 that opposite the coupler 1310 contains an integrated hydraulic fluid indicator 1345. The coupler 1310 comprises a brake elbow 1365, a union 1370 and a replenish elbow 1375. The brake rod assembly 1335 includes a brake rod 1380 terminating at a ring connector 1385. Opposite the coupler 1310, castle nut collars 1390 reinforce the brake and replenish tubes 1330 and 1340.

The hydraulic brake assembly 260 attaches on the top section of the breech nut 620, and the pneumatic spring assembly 270 attaches to the bottom section. The brake and spring assemblies 260, 270 attach to the main body 810 of the breech nut 620 using the caps 820 and 830. The recoil sleeve 250 slides through the center bore of the breech nut 620 between openings 850 and 860. The barrel tube 240 and breech 720 thread into the center bore of the breech nut 620.

The brake assembly 260 decelerates and then halts the 105 mm GAU's recoiling assembly 610 using recoil orifice sleeve 1335. During gunfire, the cylinders 630 and 640 translate while the brake rod 1380 remains stationary. Also, hydraulic fluid is forced through the holes in the recoil orifice sleeve 1335. The hydraulic fluid has viscosity that decelerates and then halts the recoiling assembly 610. Concurrently, hydraulic fluid is pushed from the replenish tube 1340 through the replenish elbow 1375, union 1370 and brake elbow 1365 into the brake tube 1330 to back-fill the rod volume of the sleeve 1335. This inhibits cavitation in the fluid and enables the same fluid to be used to throttle the recoiling assembly 610 back into the battery.

Figure 14:
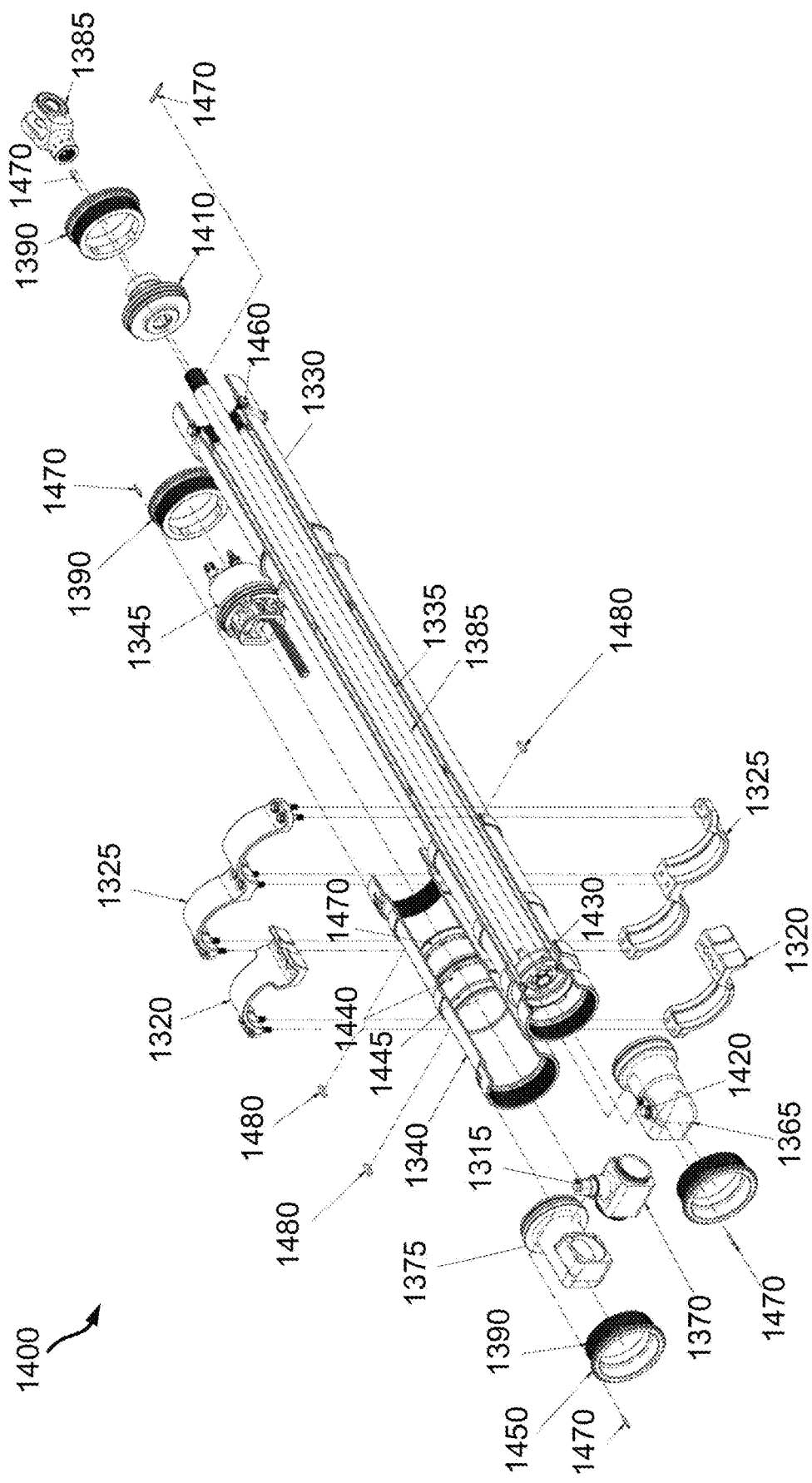
FIG. 14 is an isometric exploded view of brake assembly.

FIG. 14 shows an isometric exploded view 1400 of components for the hydraulic brake assembly 260. Components include those labeled in view 1300. The brake rod 1380 inserts into a follower 1410 while attaching to its connector 1385. The brake elbow 1365 includes a port plug 1420. The brake tube 1330 includes a seal 1430. The replenish tube 1340 further contains a piston 1440 axially flanked by seals 1445. The castle nut collars 1390 include serrated lips 1450. The clamps 1330, 1335 disassemble into symmetric halves. Port plugs 1460 restrain the brake rod 1380. Components are fastened via pins 1470 aligned by keys 1480.

Figure 15:
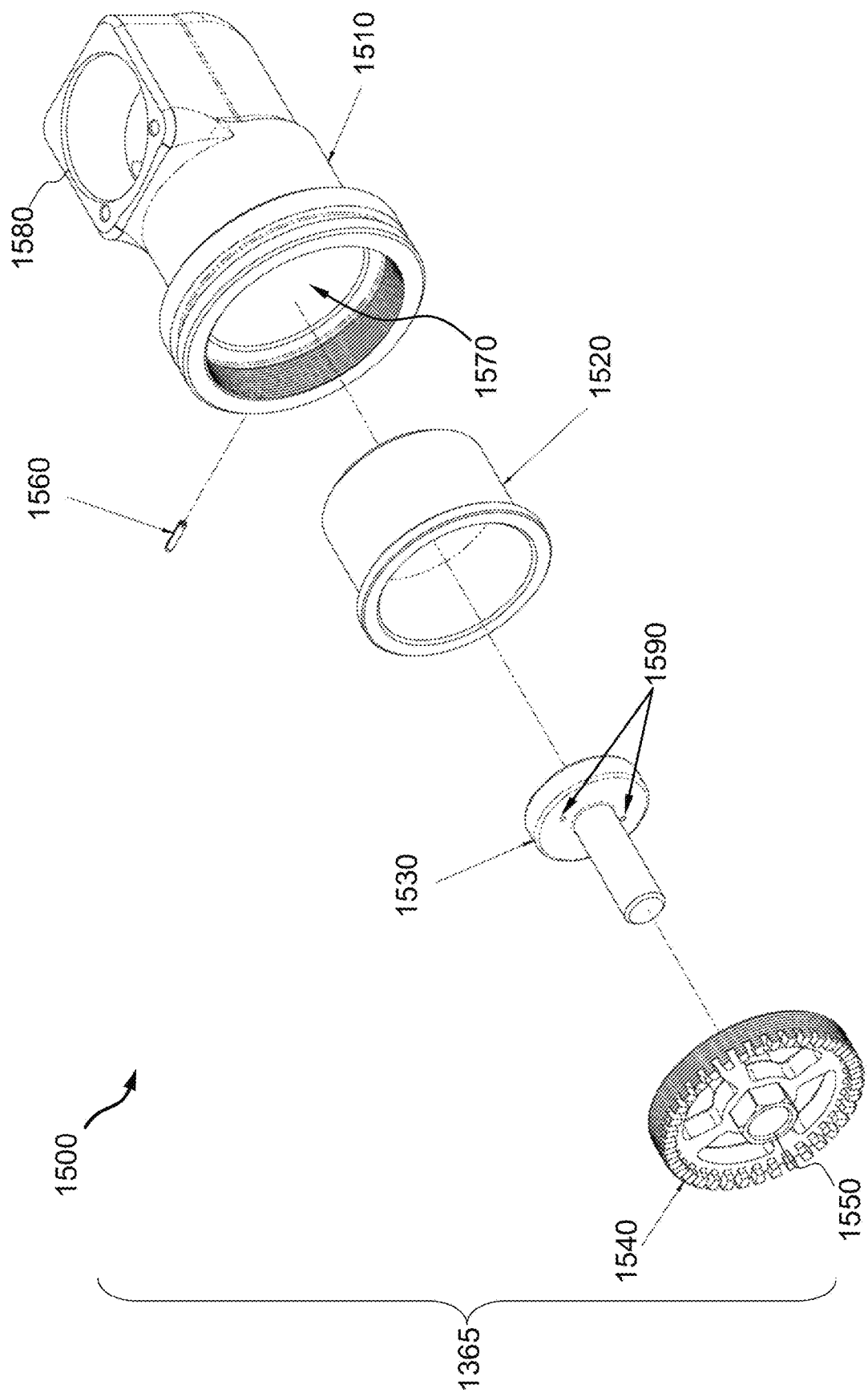
FIG. 15 is an isometric exploded view of a counter-recoil brake.

FIG. 15 shows an isometric exploded view 1500 of the inline counter-recoil brake elbow 1365. A housing 1510 for the elbow 1365 receives a plug 1520, a piston 1530 and a follower 1540 with a serrated rim 1550. These are fixed in position by a spring pin 1560 passing through an opening 1570 of the housing 1510. A cavity 1580 connects the elbow 1365 with the union 1370. The piston 1530 includes a pair of seep holes 1590 to throttle the fluid flow.

During counter-recoil, fluid is pushed from the brake tube 1330 through the brake elbow 1365 and back into the replenish tube 1340. During recoil, the counter-recoil brake piston 1530 is in the open position, permitting hydraulic fluid to flow freely from the replenish tube 1340 into the brake tube 1330. During counter-recoil, the piston 1530 is in the closed position forcing the fluid though the orifice holes 1590 throttling the fluid. This enables control of the recoiling assembly 610 while the 105 mm GAU 210 returns to battery.

Figure 16:
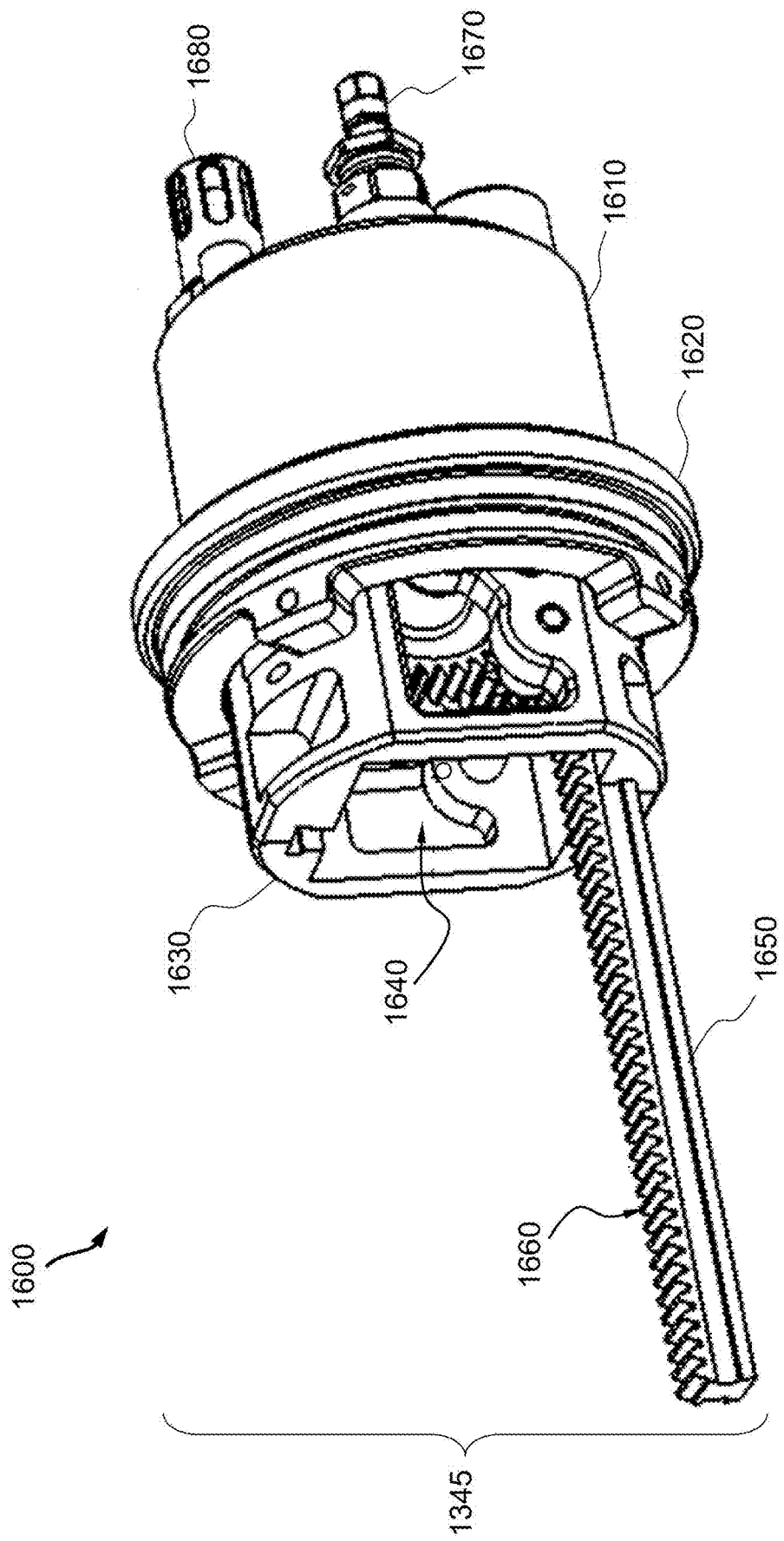
FIG. 16 is an isometric exploded view of a fluid indicator.

FIG. 16 shows an isometric view 1600 of an integrated hydraulic fluid indicator 1345 that inserts into the muzzle end of the replenish cylinder 640. This indicator 1345 includes a cylindrical housing 1610 that inserts into the tube 1330 terminating at the lip 1620. A gear box 1630 extends inside of the replenish tube 1340 with an opening 1640 from which a gear rack 1650 extends with serrated teeth 1660 for incremental translation in response to changes in fluid level. A nitrogen ($N_2$) fill port 1670 and an indicator rod (1760 in FIG. 17) with fluid level scale 1680 extend longitudinally out from the replenish tube 1340. The fluid indicator 1345 is used to monitor the fluid level during operations. A gear ratio of 3-to-1 for the gear box 1630 was selected to enable greater compactness in the design.

Figure 17:
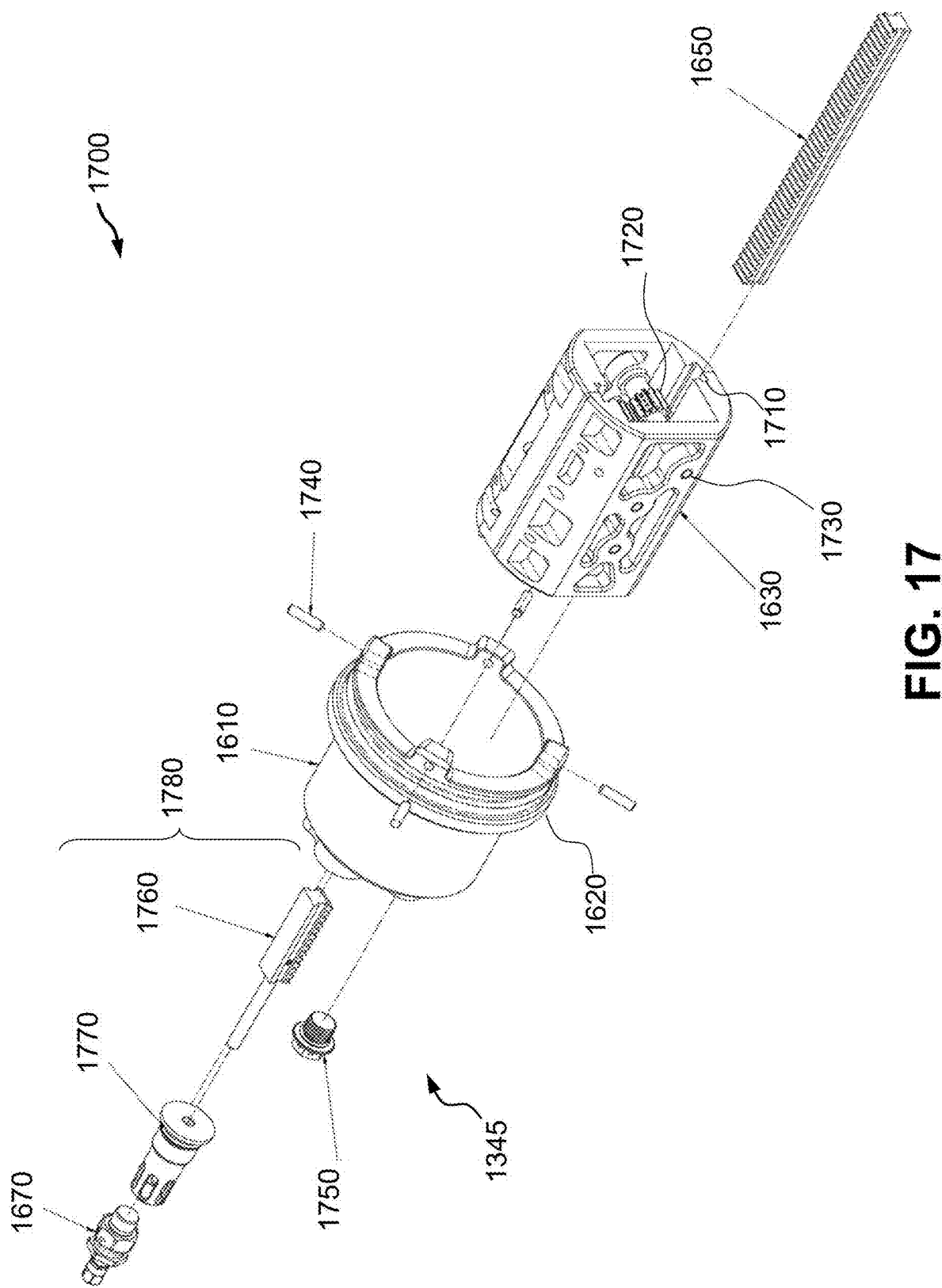
FIG. 17 is an isometric exploded view of a fluid indicator.

FIG. 17 shows an isometric exploded view 1700 of the fluid indicator 1370. The gear box 1630 includes a slot 1710 through which the gear rack 1640 inserts and engages a lower spur gear 1720 that turns on a shaft 1730. A pin 1740 secures the gear box 1630 to the rim 1620 of the housing 1610. A plug 1750 inserts into the housing 1610. The indicator rod 1760, engages with a distal spur gear (1840 in FIG. 18), which controls the position of the rod 1760 within the windows of the fluid indicator scale 1680. The indicator rod 1760, an interface connector 1770 and the fill-valve 1670 comprise a filling mechanism 1780.

Figure 18:
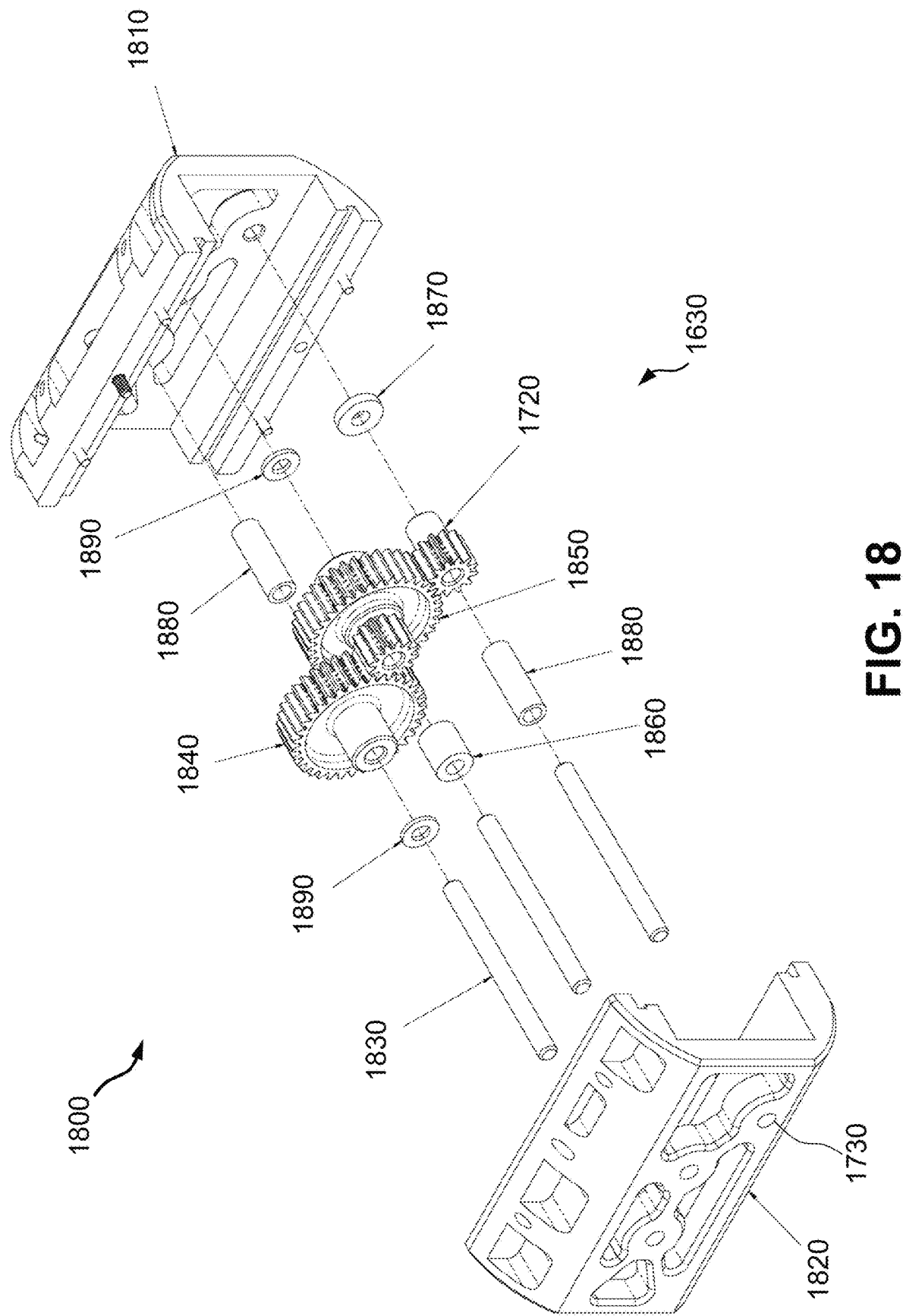
FIG. 18 is an isometric exploded view of the gear box.

FIG. 18 shows an isometric exploded view 1800 of the fluid indicator gear box 1630, which comprises distal and proximal halves 1810 and 1820. Three linear motion shafts 1830 connect a distal spur gear 1840, a proximal spur gear 1850 and the lower spur gear 1720. Nylon spacers 1860 and 1890 fits over shaft 1830 to align spur gear 1850. Nylon spacers 1870 and 1880 fit over shaft 1830 to align the lower spur gear 1720. Nylon spacers 1880 and 1890 fit over shaft 1830 to align the distal spur gear 1840.

Figure 19A:
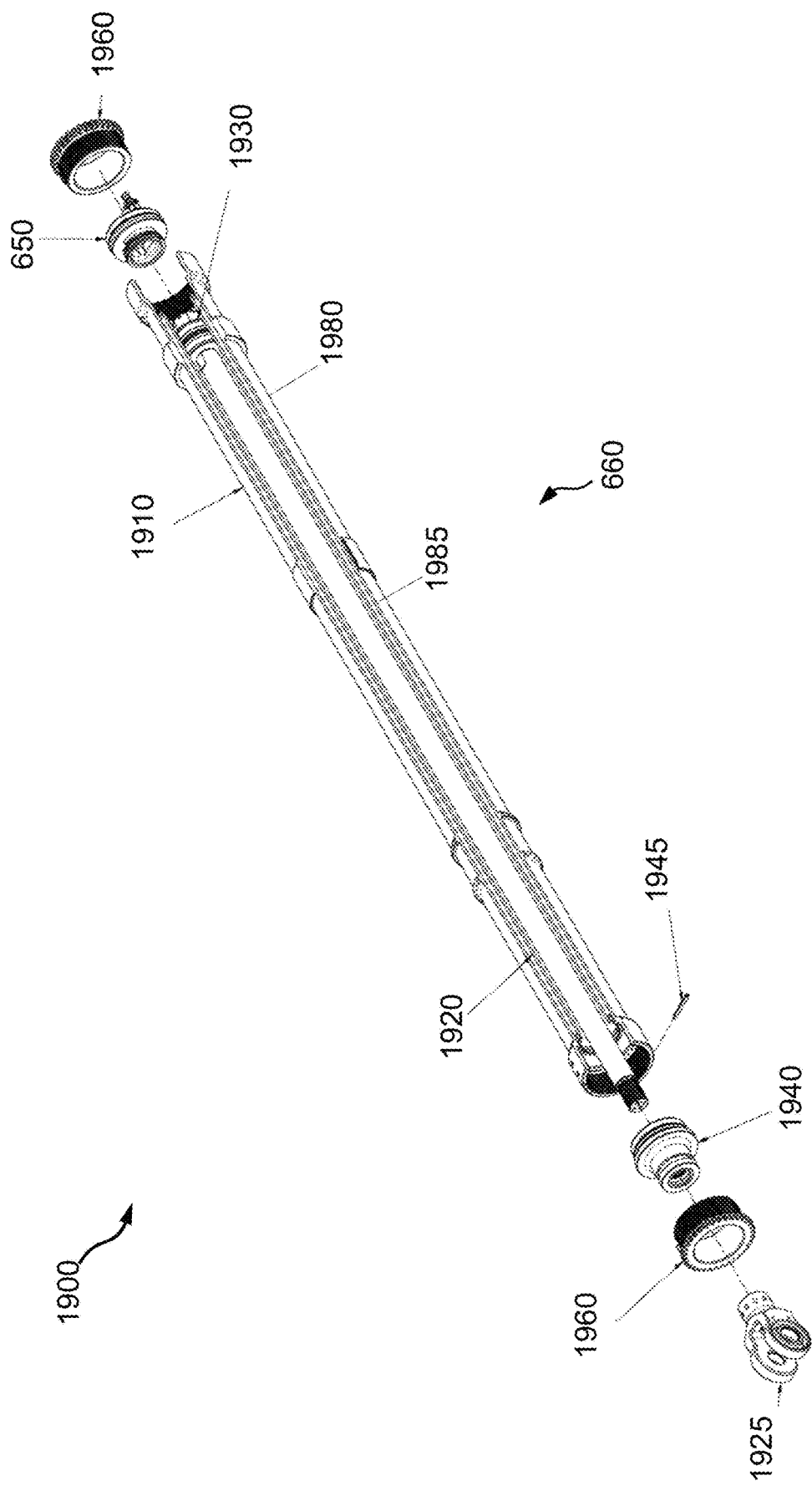
FIGS. 19B and 19A are isometric cutaway views of a pneumatic spring.
Figure 19B:
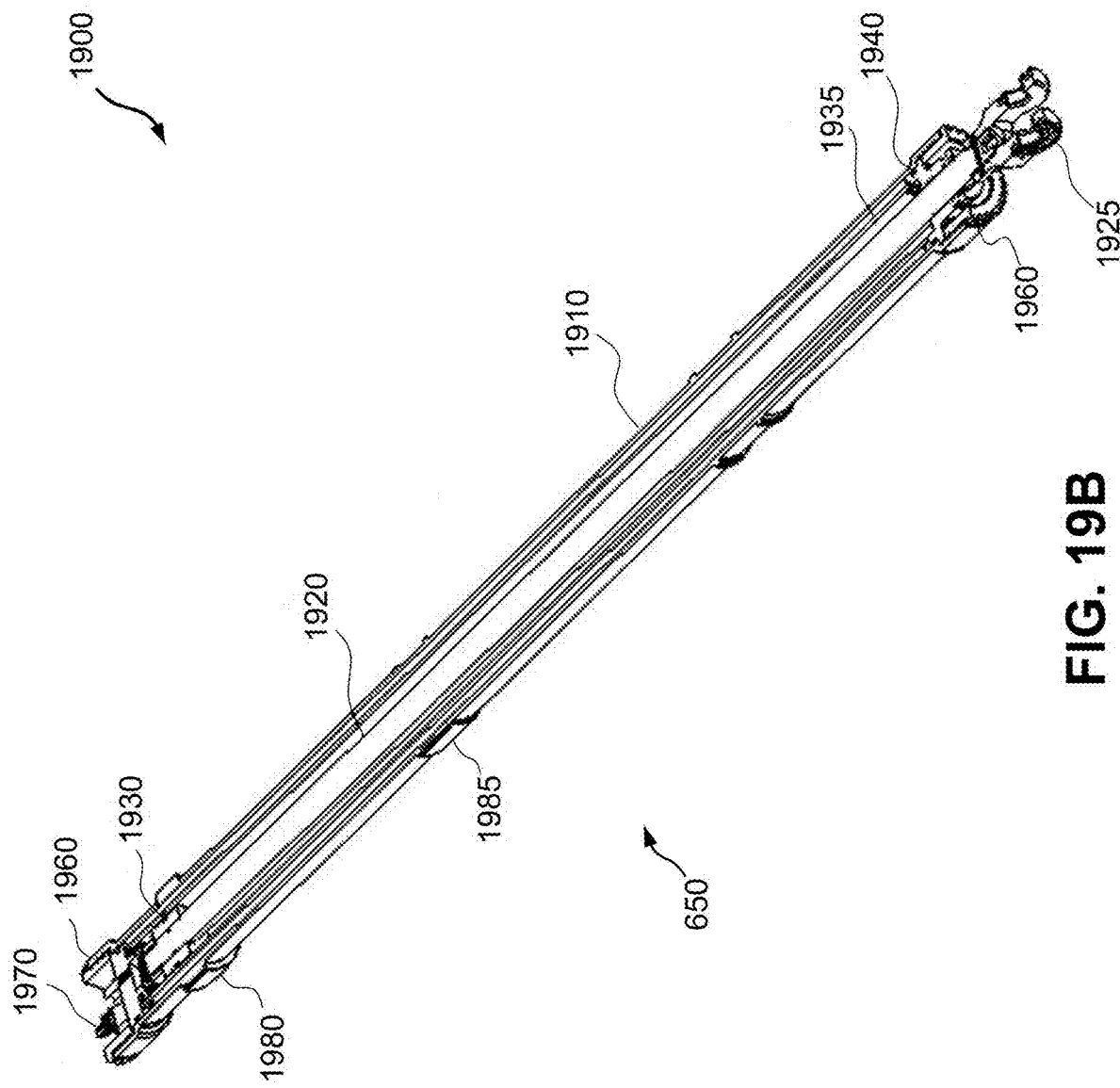

FIGS. 19A and 19B show exploded view and isometric cutaway assembly views 1900 of the pneumatic cylinder 650 of the pneumatic spring assembly 270. The components include an outer tube 1910, a spring rod 1920 terminating in a ring 1925, a piston 1930 within an inner tube 1935, a front follower 1940 fixed by pin 1945, pneumatic cap 1950, castle nut collars 1960 at either breech and muzzle ends, a nitrogen fill port 1970, and band rings 1980 and 1985. Spring rod 1920 is similar to the brake rod 1380 for the brake tube 1330. Collars 1960 are similar to the collars 1390 for the brake assembly 260, albeit having smaller diameters.

The pneumatic spring assembly 270 employs a cylinder-in-cylinder concept and serves two functions: pulling the recoiling assembly 610 back into battery and holding the recoiling assembly 610 in-battery during in-flight maneuver operations. When the recoiling assembly 610 is in-battery, the pneumatic spring assembly 270 is pressurized with nitrogen gas to a pressure value of 800 psi.

During recoil, the tubes 1910 and 1935 translate within the pneumatic cylinder 650 while the rod 1920 and piston 1930 remain stationary. Nitrogen gas is forced from the inner tube 1935 to the cavity between the inner and outer tube 1910, 1935. When the recoiling assembly 610 ceases to recoil, the potential energy from the stored nitrogen, pulls the recoiling assembly 610 back into battery enabling the 105 mm GAU 210 to be fired again.

The ring connectors 1385 and 1925 respectively attach to the uprights 1035 and 1045 on the outboard end of the cradle 490. The pressure seal 430 attaches to the outboard face of the flange 670. The cradle 490 was designed with specific stiffness and rigidity to enable fire control to stabilize the gun system 120 to ensure its accuracy.

Figure 20A:
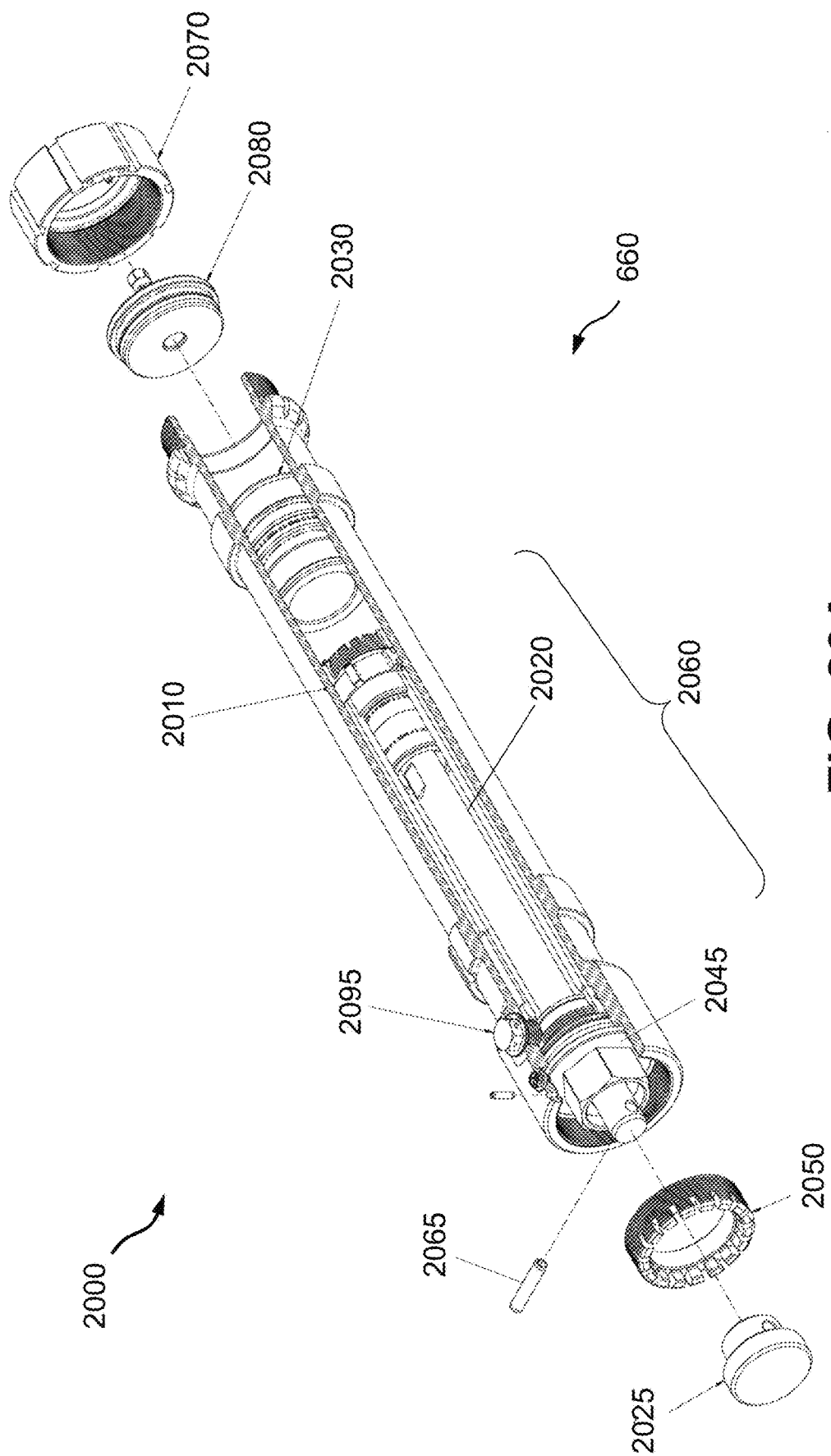
FIGS. 20B and 20A are isometric cutaway views of a counter-recoil buffer.
Figure 20B:
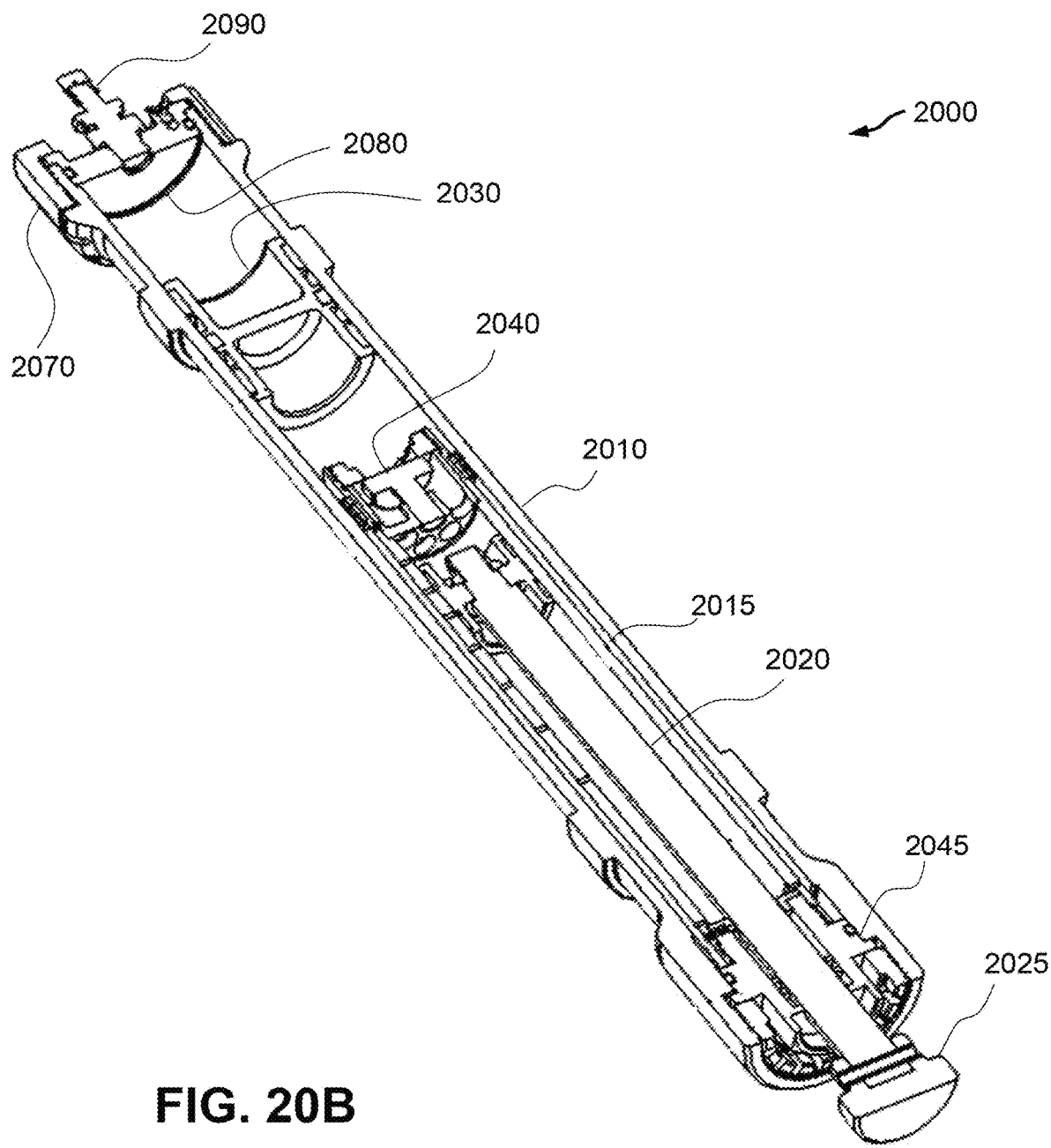

FIGS. 20A and 20B show exploded and isometric cutaway views 2000 of the counter-recoil buffer 660 as a gas-over-hydraulic system. The components include a buffer tube 2010 an orifice sleeve 2015, a buffer rod 2020 terminating in an end cap 2025, a floating piston 2030, a throttle valve 2040 capped by a front follower 2045 enveloped by a castle nut 2050. The rod 2020 translates within an orifice sleeve 2015. The tube 2010, sleeve 2015, rod 2020 and valve 2040 denote a counter-recoil assembly 2060. The buffer tube 2010 terminates at the breech end by a rear nut 2070, which contains a plug 2080 into which a fill port 2090 inserts. A secondary plug 2095 penetrates the tube 2010 in the extension 2015.

The external counter-recoil buffers 660 are incorporated to decelerate the recoiling assembly 610 during the last 7" of counter-recoil. These buffers 660 are needed to account for the additional gravity vector as the GAU 210 fires at different elevation angles throughout the trainable envelop. Commercial off-the-shelf (COTS) buffers were obtained for design testing but failed during testing. This resulted in a custom design that was sufficiently rugged to survive the gunfire loads.

Figure 21A:
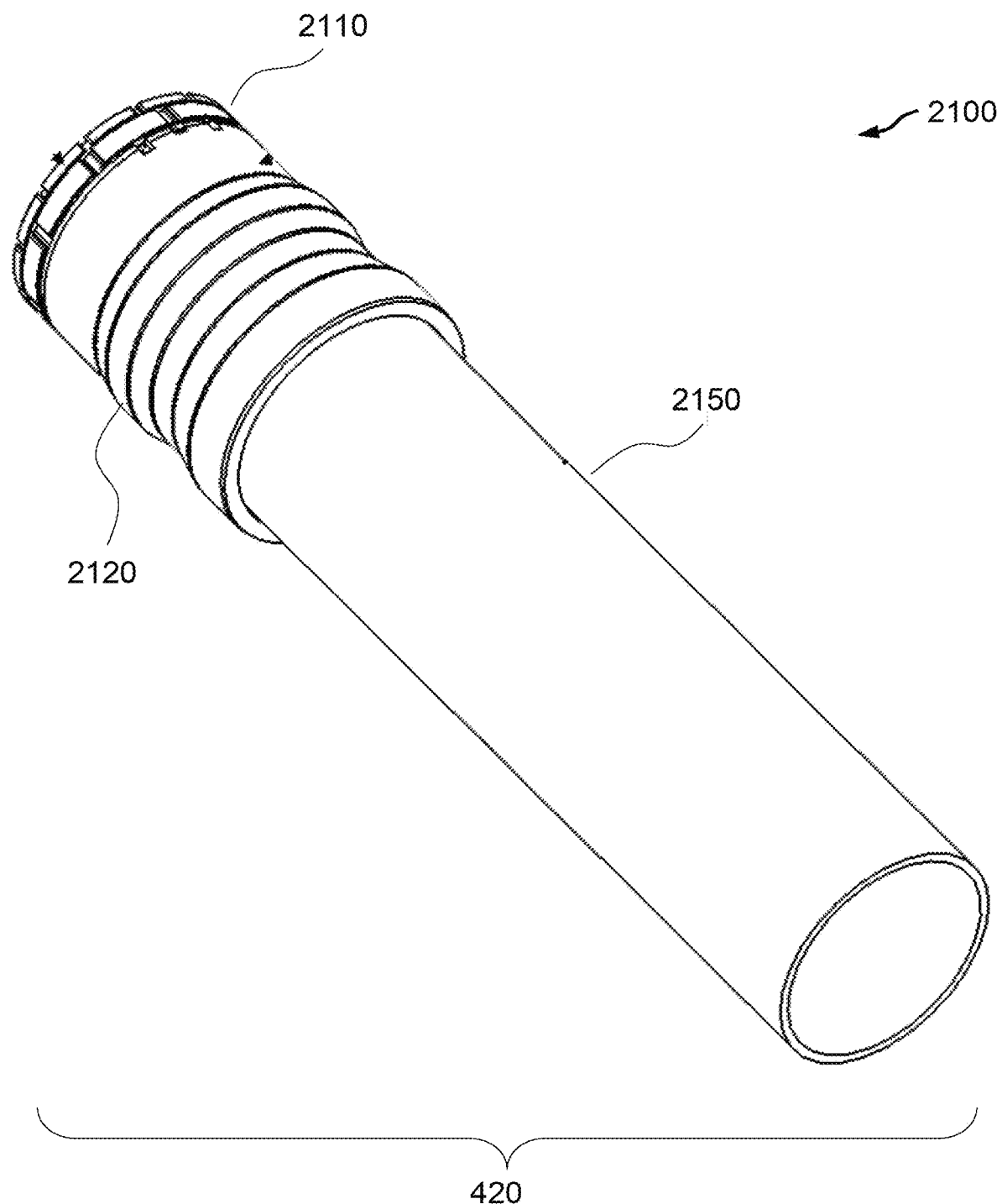
FIGS. 21A and 21B are isometric assembly and exploded views of a blast diffuser.
Figure 21B:
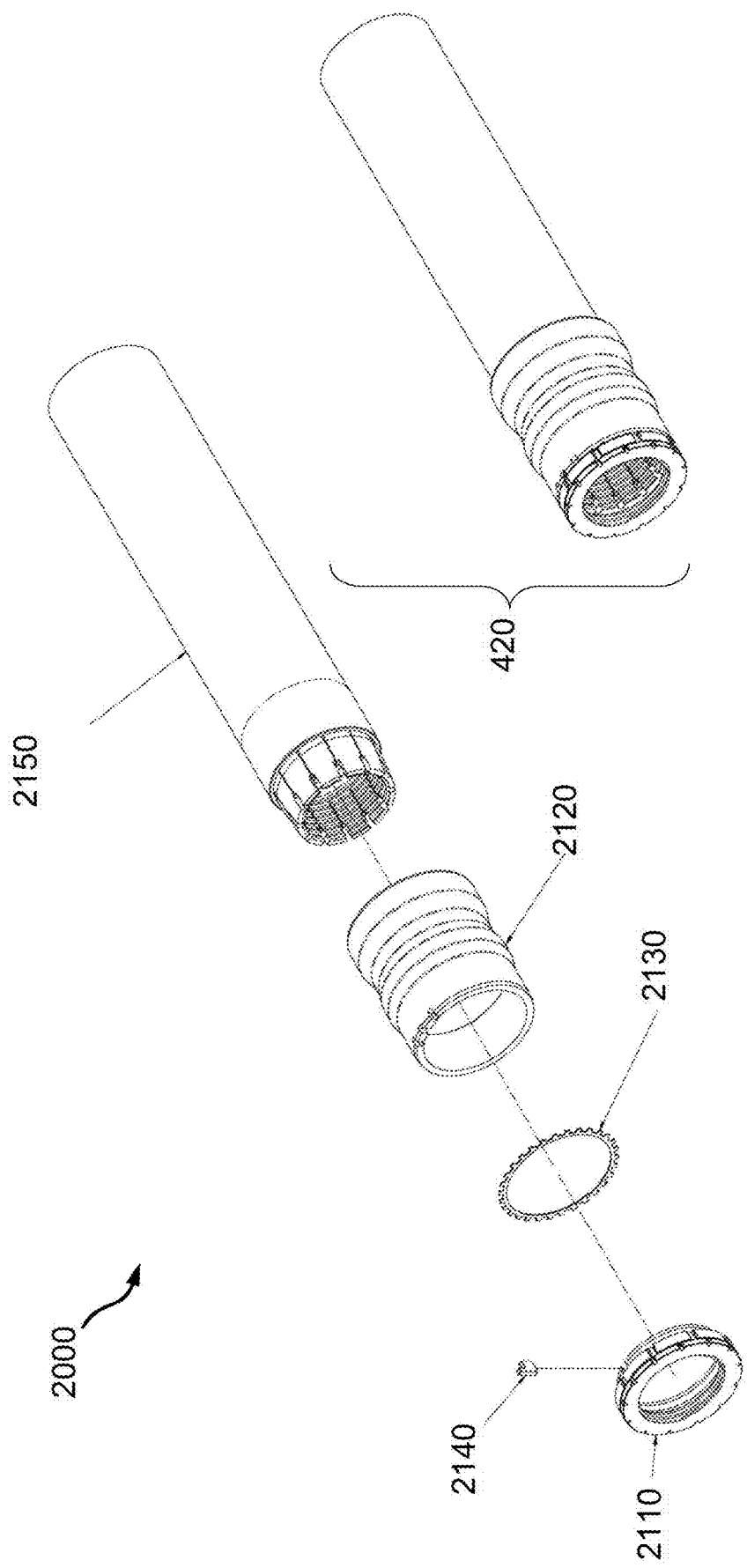

FIGS. 21A and 21B show isometric cutaway and exploded views 2100 of the blast diffuser 420. The components include jam nut 2110, safety stop 2120 and diffuser tube 2150. The safety stop 2120 is disposed between the jam nut 2110 and the diffuser tube 2150. The diffuser tube 2150 extends beyond the gun tube 240. The blast diffuser 420 threads on the muzzle end of the gun tube 240 and is used to force the blast over pressure away from the skin of the aircraft 110. The safety stop 2120 slides over the tube diffuser 2150 and serves two functions. When the 105 mm GAU 210 retracts to the "pressurization" position, the safety stop 2120 seals with the inside of the cradle 490, thereby enabling the fuselage interior to pressurize. The safety stop 2120 is also designed to wedge into the cradle 490 to prevent the 105 mm GAU 210 from damaging the aircraft 110 in the event of a failure with the brake system 260.

Figure 22:
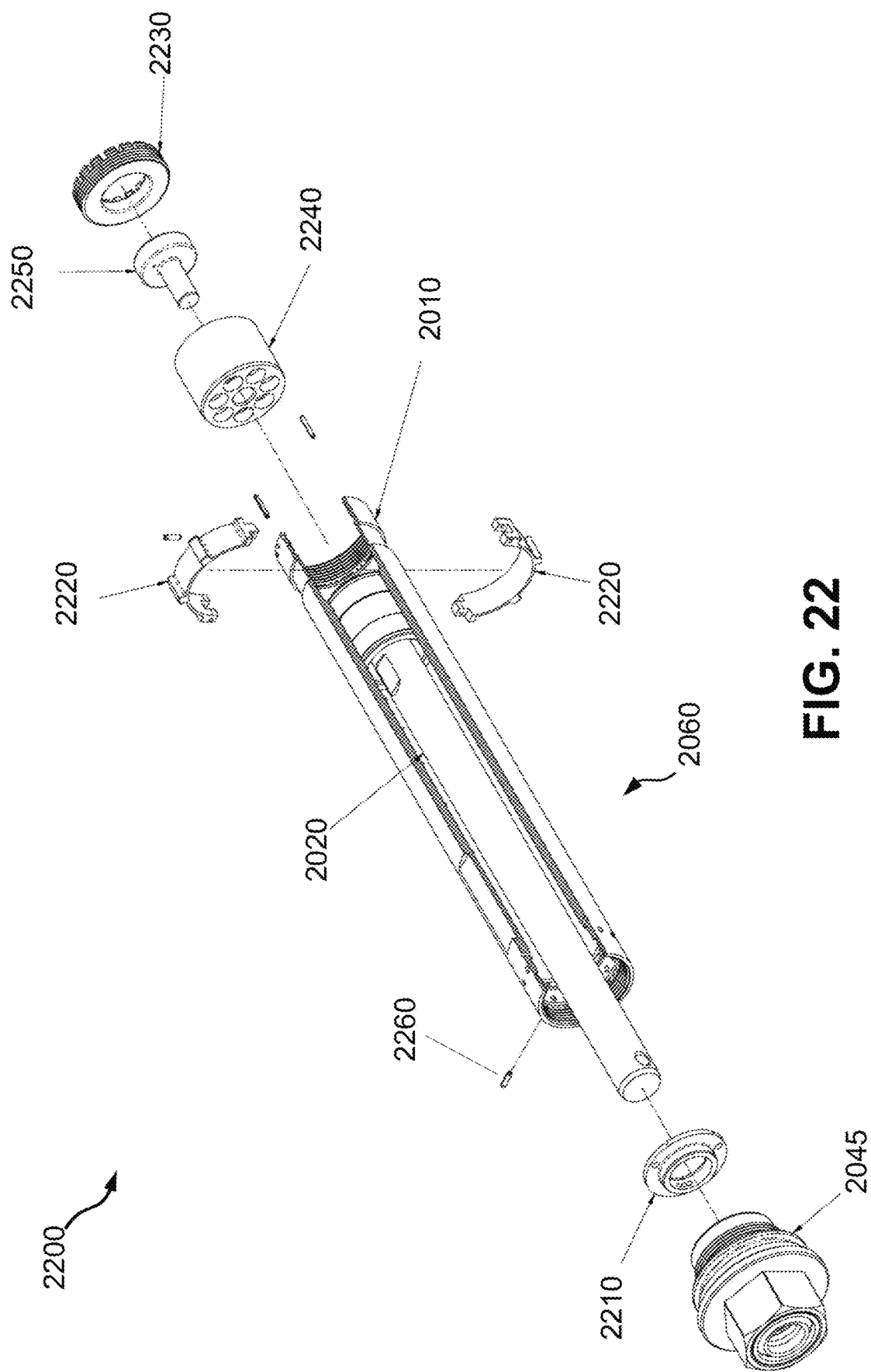
FIG. 22 is an isometric exploded view of a counter-recoil buffer brake assembly.
Figure 23:
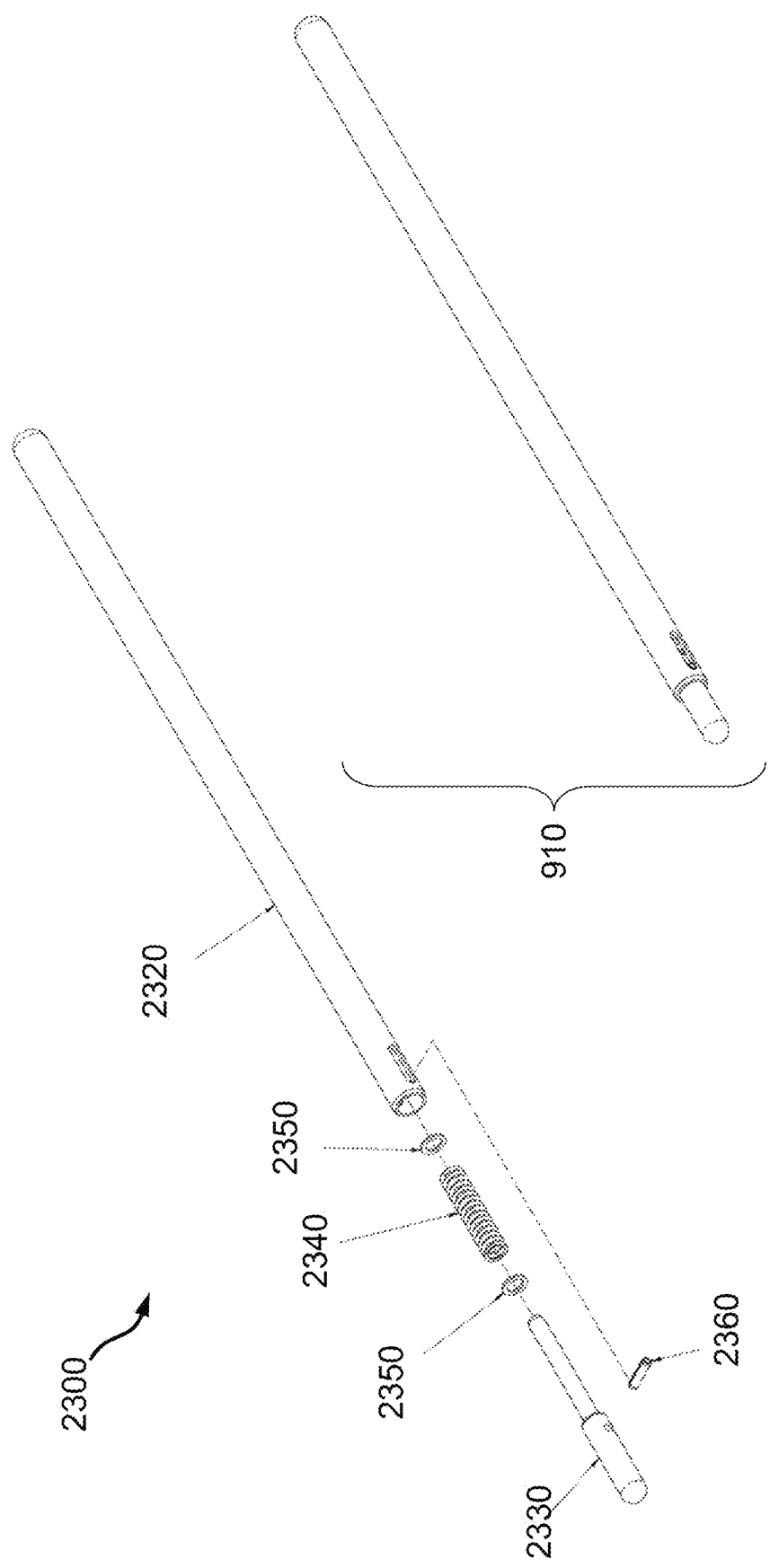
FIG. 23 is an isometric exploded view of a spring loaded rod.

FIG. 22 shows an isometric cutaway view 2200 of the counter-recoil assembly 2060. The components include buffer tube 2010, rod 2020, piston 2030, valve 2040, follower 2045, spacer cap 2210, clamps 2220, castle nut 2230, chamber 2240, piston 2250 and pins 2260. FIG. 23 shows an isometric exploded and assembly views 2300 of the spring loaded rod 910 for securing the yoke 290 to the pressure plate 580. The components include tube 2320, rod 2330, helical compression spring 2340, washers, 2350 and spring pin 2360.

The brake assembly 260 was designed for depressed angle shooting of the gun system 120 from the aircraft 110.
  (a) A counter-recoil brake 1340 was incorporated to reduce the acceleration of the recoiling assembly 610 while traveling back into the battery. Because the 105 mm GAU 210 shoots depressed, unlike most large weapon systems, the system 120 requires control while returning to the battery to prevent the recoiling assembly 610 from slamming into the cradle 490. Hydraulic fluid is throttled through an orifice in the piston 1530 of the counter-recoil brake assembly 260 to control the system during counter-recoil;
  (b) The recoil orifice sleeve 1335 was also optimized to shoot depressed from an aircraft 110. The orifice area was tuned at each increment on recoil distance enabling us to stretch out the recoil stroke to reduce and optimize the recoil forces into the gun cradle 490. This optimization enables reduction of the initial impulse into the gun cradle 490 and the aircraft pallet 220 on the aircraft's cargo deck 310. This enables one to reduce to overall maintenance burden on the aircraft 110.
  (c) The counter-recoil buffer 660 designed to take the inertial loading from gunfire. COTS buffers were originally employed, but they did not hold up to the inertial loads. Several issues were identified with the COTS buffers during range and flight testing. After ruggedizing the COTS buffers as much as possible, the conclusion was reached that nothing on the market existed to satisfy the requirements. A smaller scale version of the exemplary hydraulic brake 260 was designed for use as exemplary counter-recoil buffer 660. These custom counter-recoil buffers 660 were optimized to satisfy the loading conditions that the counter-recoil buffer 660 will experience as the 105 mm GAU 210 shoots throughout the trainable envelope.

The recoiling assembly 610 was designed to reduce the overall maintenance burden on the system:

(a) The 105 mm GAU 210 was designed with maintenance in mind. The system 120 was designed with caps 820 and 830 on the breech nut 620 to enable a quick and easy change out of the brake assembly 260 and pneumatic spring assembly 270. This technique of replacing the brake assembly 260 and pneumatic spring assembly 270 on the aircraft 110 has dramatically reduced the time required to return the 105 mm GAU 210 to its prior position and shoot when the brake system 260 or the pneumatic spring 270 has a maintenance issue. This exemplary process takes a matter of minutes not hours or even a day compared to the conventional process;

(b) The modular design of the recoil mechanism 1110 enables easy replacement of the recoil orifice sleeve 1335 to optimize the 105 mm GAU 210 for different charge weights. The exemplary recoil orifice sleeve 1335 design along with the brake system 260 design enables the maintainers to change out the recoil orifice sleeve 1335 fairly easily to optimize the recoil stroke of the 105 mm GAU 210 for different charge weights. This enables a weapon system to easily shoot different charge weight ammunition.

A gear ratio of 3:1 in the fluid indicator enables compact packaging while accounting for thermal expansion. This gear rack design in the fluid indicator 1370 enables one to have a small and compact design while still accounting for the full operation temperature window that the 105 mm GAU 210 could be fired within. This compact design also enables one to not extend the length of the replenish cylinder 640. Any additional mass that added to the recoiling components would increase the loading and stress in the breech nut 620 due to the inertial loading. This compact design saved a few thousand pounds of force on the breech nut 620.

The locking mechanism for the blast diffuser 420 was redesigned to reduce risk of loosening during gunfire. This design accommodates maintenance and operation. The conventional design relied on match drilling and tapping threads into the gun tube 240 after installation on the aircraft 110. Set screws were then installed to lock the diffuser tube 2150 and safety stop 2120 in place, although alternative fasteners can be used. These set screws would brake regularly due to the inertial loading from gun fire and necessitate scheduled replacement.

The exemplary design uses a wedge-and-collet style locking mechanism. The wedge is driven over the threads on the blast diffuser 420 using a large acme thread jam nut 2110 locking the blast diffuser 420 in place. This is a simple and easily reusable technique to lock the blast diffuser 420 in place. The wedge-and-collet style locking mechanism is able to keep the blast diffuser 420 tightly attached to the gun tube 240 during gun firing and was designed to withstand the gun fire inertial loading without failing.

The engineering team performed an Analysis of Alternatives including modifying other existing field gun mounts as well as reproducing the original cradle and mechanisms. These alternatives would leave the engineering deficiencies in place and alternative cradles would require significant modification in order to interface with the conventional Trainable Gun Mount. There are currently no alternative systems in production, either foreign or domestic, that can provide the desired level of performance.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A recoil device for a gun having a barrel with a breech, said device comprising:
    a breech nut that attaches around the barrel, said breech nut having first and second adjacent sides;
    a brake assembly including a brake cylinder that mounts to said breech nut on said first side;
    a pneumatic spring that mounts to said breech nut on said second side; and
    a counter-recoil buffer that attaches to said pneumatic spring, wherein said brake cylinder and said pneumatic spring internally push fluids for recoil absorption and return in response to firing the gun.

2. The device according to claim 1, wherein said brake cylinder includes a replenish cylinder that together share a chamber.

3. The device according to claim 1, wherein hydraulic fluid fills said brake cylinder.

4. The device according to claim 1, wherein said buffer comprises a pair of buffers.

5. The device according to claim 1, further including a blast diffuser that attaches to the barrel opposite the breech.

* * * * *